US008359827B2

(12) United States Patent
Shibata et al.

(10) Patent No.: US 8,359,827 B2
(45) Date of Patent: Jan. 29, 2013

(54) ABNORMALITY DIAGNOSIS SYSTEM AND METHOD FOR DIAGNOSING ABNORMALITY IN FILTER REGENERATION SYSTEM

(75) Inventors: Daisuke Shibata, Numazu (JP); Koichi Kitaura, Odawara (JP); Hiroshi Sawada, Gotenba (JP); Tatsuya Tsuji, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 6 days.

(21) Appl. No.: 12/677,277

(22) PCT Filed: Feb. 24, 2009

(86) PCT No.: PCT/JP2009/053290
§ 371 (c)(1),
(2), (4) Date: Mar. 9, 2010

(87) PCT Pub. No.: WO2010/097893
PCT Pub. Date: Sep. 2, 2010

(65) Prior Publication Data
US 2011/0314792 A1    Dec. 29, 2011

(51) Int. Cl.
*F01N 3/00* (2006.01)
(52) U.S. Cl. ............. 60/277; 60/295; 60/301; 60/297
(58) Field of Classification Search .......... 60/277, 60/295, 301, 297
See application file for complete search history.

(56) References Cited

U.S. PATENT DOCUMENTS

| 5,195,316 A | 3/1993 | Shinzawa et al. |
| 2004/0144087 A1 | 7/2004 | Kondou et al. |

FOREIGN PATENT DOCUMENTS

| EP | 1 529 929 A1 | 5/2005 |
| JP | A-3-199616 | 8/1991 |
| JP | A-7-317529 | 12/1995 |
| JP | A-10-77826 | 3/1998 |
| JP | A-2002-256846 | 9/2002 |
| JP | A-2004-218558 | 8/2004 |
| JP | 2005054631 A * | 3/2005 |
| JP | A-2005-54631 | 3/2005 |
| JP | B2-4008866 | 9/2007 |
| JP | A-2008-57443 | 3/2008 |
| JP | A-2008-121631 | 5/2008 |

OTHER PUBLICATIONS

International Search Report issued International Patent Application No. PCT/JP2009/053290, mailed on Jun. 2, 2009 (with English Translation).

* cited by examiner

*Primary Examiner* — Thomas Denion
*Assistant Examiner* — Matthew T Largi
(74) *Attorney, Agent, or Firm* — Oliff & Berridge, PLC

(57) ABSTRACT

The invention intends to provide a technology which makes it possible to diagnose with higher accuracy whether or not abnormality occurs in a filter regeneration system causing excessive execution frequency of a regeneration process. The filter regeneration system initiates execution of the regeneration process, incase an estimated particulate matter (PM) accumulation amount at the filter reaches a pre-determined regeneration requiring accumulation amount; or in case the pressure upstream of the filter or the differential pressure across the filter reaches a pre-determined regeneration requiring value, the value being larger than the pressure or the differential pressure corresponding to the regeneration requiring accumulation amount. Then, the diagnosis is carried out based on a ratio of an estimated PM accumulation amount at the initiation of the execution of the regeneration process to the regeneration requiring accumulation amount.

14 Claims, 12 Drawing Sheets

ABNORMALITY DIAGNOSIS SYSTEM AND METHOD FOR DIAGNOSING ABNORMALITY IN FILTER REGENERATION SYSTEM

TECHNICAL FIELD

The present invention relates to a system and a method for diagnosing abnormality in a system executing a regeneration process for a particulate filter placed in an exhaust passage of an internal combustion engine.

BACKGROUND ART

A particulate filter (hereinafter simply referred to as a "filter") may be placed in an exhaust passage of an internal combustion engine to trap particulate matter (hereinafter referred to as "PM") in the exhaust gas of the internal combustion engine. In this case, operation of the internal combustion engine may be negatively affected by increase of the back-pressure, if the PM accumulation amount at the filter should increase excessively. Further, if the PM accumulates excessively at the filter and is oxidized, the filter temperature may increase excessively by the oxidation heat, which may eventually cause erosion or breakage of the filter. To prevent such problems, a filter regeneration system conducting a regeneration process by oxidizing and removing the PM accumulated at the filter has been employed.

Patent Document 1 describes a technology concerning an exhaust gas purification device carrying out a regeneration process as described above. The exhaust gas purification device disclosed in Patent Document 1 is provided with the first decision means for deciding the timing of the regeneration process, when the differential pressure across the filter exceeds a pre-determined value, and the second decision means for deciding the timing of the regeneration process, when the PM accumulation amount reaches or exceeds a pre-determined value. Further, a number of consecutive regenerations, namely series of busy regeneration periods whose regeneration time intervals between the decisions for the regeneration process are shorter than a threshold value, is counted, and if the number exceeds a threshold value, the PM discharged amount from the engine is judged abnormal.

[Patent Document 1] Japanese Patent No. 4008866
[Patent Document 2] Japanese Patent Laid-Open No. 2008-57443
[Patent Document 3] Japanese Patent Laid-Open No. 2008-121631
[Patent Document 4] Japanese Patent Laid-Open No. 2004-218558

DISCLOSURE OF THE INVENTION

Problems to be Solved by the Invention

When a filter regeneration process is executed, the PM accumulated at the filter is once removed, and the PM accumulation amount increases again gradually after the termination of the execution of the regeneration process. In this case, when the PM accumulation amount is at a low level, a PM trapping rate of the filter (a rate of the PM amount trapped by the filter to the PM amount flown into the filter) is lower compared to a state where the PM accumulation amount is at a high level. In other words, when the regeneration process is executed and the PM is removed, the rate of the PM that passes through the filter rises immediately after the termination of the execution of the regeneration process.

In some cases a catalyst having an oxidization function, such as an oxidation catalyst and a NOx storage reduction catalyst, is carried on the filter. In such case, if the filter temperature is raised due to execution of the regeneration process, deactivation of the carried catalyst may be accelerated. With the acceleration of the deactivation of the carried catalyst, the oxidation of a reducing agent supplied to the catalyst or HC or the like in the exhaust gas by the catalyst should become difficult.

Moreover, in case a NOx storage reduction catalyst is carried on the filter, the amount of NOx to be stored and reduced by the NOx storage reduction catalyst is decreased during execution of the regeneration process due to a higher temperature of the NOx storage reduction catalyst.

From the above reason, in case any abnormality in the filter regeneration system should occur and the execution frequency of the regeneration process become excessively high, the overall nature of exhaust emissions may be aggravated. To prevent the aggravation of the nature of the exhaust emissions, it is required to detect correctly abnormality in the filter regeneration system causing excessive execution frequency of the regeneration process.

The present invention has been conducted addressing the afore-described problems, with an object to provide a technology which makes it possible to diagnose with higher accuracy whether or not abnormality occur in the filter regeneration system causing excessive execution frequency of the regeneration process.

Means for Solving the Problems

According to the present invention, abnormality in a filter regeneration system that initiates execution of the regeneration process, in case an estimated PM accumulation amount at the filter reaches a pre-determined regeneration requiring accumulation amount; or in case the pressure upstream of the filter or the differential pressure across the filter reaches a pre-determined regeneration requiring value, the value being larger than the pressure or the differential pressure corresponding to the regeneration requiring accumulation amount, is diagnosed based on the ratio of an estimated PM accumulation amount at the initiation of the execution of the regeneration process to the regeneration requiring accumulation amount.

More particularly, an abnormality diagnosis system for a filter regeneration system according to the first invention is an abnormality diagnosis system for a filter regeneration system for executing a regeneration process of a particulate filter placed in an exhaust passage of an internal combustion engine wherein, the filter regeneration system comprises an accumulation amount estimation unit for estimating an accumulation amount of particulate matter at the particulate filter;

a pressure determination unit for determining a pressure upstream of the particulate filter in the exhaust passage or a differential pressure across the particulate filter; and an execution unit for the regeneration process for executing the regeneration process to oxidize and remove the particulate matter accumulated at the particulate filter; and initiates execution of the regeneration process by the execution unit for the regeneration process, in case the accumulation amount of the particulate matter estimated by the accumulation amount-estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount, characterized in that the abnormality diagnosis system for the filter regeneration system comprises:

a parameter calculation unit for calculating a ratio of: an accumulation amount of the particulate matter at the initiation of the execution of the regeneration process estimated by the accumulation amount estimation unit to the regeneration requiring accumulation amount as a parameter for execution frequency of regeneration; and a diagnosis unit for diagnosing based on the parameter for execution frequency of regeneration whether or not abnormality is occurring in the filter regeneration system causing excessive execution frequency of the regeneration process.

In the filter regeneration system according to the present invention, the regeneration process is usually executed when an estimated PM accumulation amount at the filter reaches a pre-determined regeneration requiring accumulation amount. However, when the pressure upstream of the filter or the differential pressure across the filter reaches a pre-determined regeneration requiring value, the regeneration process is executed, even if the estimated PM accumulation amount has not reached the pre-determined regeneration requiring accumulation amount due to some abnormality occurring in the system.

In case a regeneration process is executed as described above, when the pressure upstream of the filter or the differential pressure across the filter reaches a pre-determined regeneration requiring value, the execution frequency of the regeneration process becomes higher than usual. Consequently, a ratio of an estimated value of the PM accumulation amount at the initiation of the execution of the regeneration process (hereinafter referred to as the "PM accumulation amount at the initiation of regeneration") to the regeneration requiring accumulation amount is calculated according to the present invention as a parameter for execution frequency of regeneration.

At a normal operation, the estimated PM accumulation amount at the initiation of regeneration is equal to the regeneration requiring accumulation amount, and therefore the value of the parameter for execution frequency of regeneration is equal to 1. On the other hand, in case a regeneration process is executed by reason that the pressure upstream of the filter or the differential pressure across the filter has reached a pre-determined regeneration requiring value, the estimated PM accumulation amount at the initiation of regeneration is less than the regeneration requiring accumulation amount, and the value of the parameter for execution frequency of regeneration varies depending on an estimated value of the PM accumulation amount at the initiation of regeneration.

Consequently, whether or not abnormality occurs in the filter regeneration system causing excessive execution frequency of the regeneration process is diagnosed based on the thus calculated parameter for execution frequency of regeneration.

The parameter for execution frequency of regeneration according to the present invention exhibits a high correlation with a change in the execution frequency of the regeneration process due to abnormality in the filter regeneration system. It is conceivable to calculate an execution frequency of regeneration based on a travel distance or time period from the previous termination time of the regeneration process to the current initiation time of the regeneration process. However, the length of such travel distance or time period varies depending on operation conditions of the internal combustion engine during such period, even when there occurs no abnormality in the filter regeneration system. Therefore, it is difficult to diagnose accurately abnormality in the filter regeneration system based on the execution frequency of regeneration calculated from the length of the travel distance or the time period. On the contrary, the parameter for execution frequency of regeneration according to the present invention is a value not affected by the operation conditions of the internal combustion engine between the termination time of the previous regeneration process and the initiation time of the current regeneration process.

Consequently, whether or not abnormality occurs in the filter regeneration system causing excessive execution frequency of the regeneration process can be diagnosed with higher accuracy according to the present invention.

According to the present invention, representing an estimated PM accumulation amount at the initiation of regeneration by Mreq, and a regeneration requiring accumulation amount by Mnrm, a parameter for execution frequency of regeneration can be given by Freq=Mreq/Mnrm. In this case, the diagnosis unit may diagnose that abnormality is occurring in the filter regeneration system causing excessive execution frequency of the regeneration process, when the parameter for execution frequency of regeneration Freq is smaller than a pre-determined criterion value.

In the above case, if a regeneration process is executed by reason that the pressure upstream of the filter or the differential pressure across the filter reaches a regeneration requiring value, the parameter for execution frequency of regeneration Freq is less than 1 (Freq<1). In this case the pre-determined criterion value is less than 1 and can be judged as the upper allowable limit of the aggravation of the nature of exhaust emissions caused by the execution of the regeneration process.

According to the second invention, an abnormality diagnosis system for a filter regeneration system for executing a regeneration process of a particulate filter placed in an exhaust passage of an internal combustion engine is characterized in:

that the filter regeneration system comprises an accumulation amount estimation unit for estimating an accumulation amount of particulate matter at the particulate filter;

a pressure determination unit for determining a pressure upstream of the particulate filter in the exhaust passage or a differential pressure across the particulate filter; and an execution unit for the regeneration process for executing the regeneration process to oxidize and remove the particulate matter accumulated at the particulate filter;

initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount; and terminates the execution of the regeneration process, in case, after the initiation of the execution of the regeneration process, the accumulation amount of the particulate matter at the particulate filter is judged to have decreased to a pre-determined base accumulation amount; and that the abnormality diagnosis-system for the filter regeneration system comprises:

a parameter calculation unit for calculating a ratio of the difference between an accumulation amount of the particulate matter at the initiation of the execution of the regeneration process estimated by the accumulation amount estimation unit and the base accumulation amount to the difference between the regeneration requiring accumulation amount and the base accumulation amount as a parameter for execution frequency of regeneration; and a diagnosis unit for diagnosing based on the parameter for execution frequency of regeneration whether or not abnormality is occurring in the filter regeneration system causing excessive execution frequency of the regeneration process.

At an execution of the regeneration process, if the process execution should be continued to the lowest possible level of the PM accumulation amount at the filter, a considerably large amount of fuel is required for the regeneration process. Consequently, in the filter regeneration system according to the present invention, the execution of the regeneration process is terminated, when the PM accumulation amount at the filter is judged to have decreased to a pre-determined base accumulation amount after initiation of the execution of the regeneration process.

The term "a pre-determined base accumulation amount" above unit an amount larger than the lowest PM accumulation amount attainable by the regeneration process, and from which certain time allowance is judged to be available until the PM accumulation amount increases again to a regeneration requiring threshold value.

Further, by the filter regeneration system according to the present invention, the following method may be applied to determine whether or not the PM accumulation amount at the filter has decreased to the base accumulation amount. Namely, in case the execution of the regeneration process is initiated by reason that the PM accumulation amount at the filter reaches a regeneration requiring accumulation amount, a PM removal amount from the initiation of the execution of the regeneration process is estimated. Then, it is discriminated whether or not the value obtained by subtracting the PM removal amount from the regeneration requiring accumulation amount reaches the base accumulation amount. Furthermore, in case the execution of the regeneration process is initiated by reason that the pressure upstream of the filter or the differential pressure across the filter reaches the regeneration requiring value, it is discriminated whether or not the pressure upstream of the filter or the differential pressure across the filter reaches a value corresponding to the base accumulation amount.

Moreover, according to the present invention, a ratio of the difference between the PM accumulation amount at the initiation of the execution of the regeneration process and the base accumulation amount to the difference between the regeneration requiring accumulation amount and the base accumulation amount is calculated as a parameter for execution frequency of regeneration. Further the diagnosis whether or not abnormality is occurring in the filter regeneration system causing excessive execution frequency of the regeneration process is made based on the thus calculated parameter for execution frequency of regeneration.

The parameter for execution frequency of regeneration according to the present invention is similar to the first invention a value not affected by the operation conditions of the internal combustion engine between the termination time of the previous regeneration process and the initiation time of the current regeneration process, and exhibits a high correlation with a change in the execution frequency of the regeneration process due to abnormality in the filter regeneration system.

Consequently, according to the present invention, as in the first invention, whether or not abnormality occurs in the filter regeneration system causing excessive execution frequency of the regeneration process can be diagnosed with higher accuracy.

According to the present invention, representing an estimated PM accumulation amount at the initiation of regeneration by Mreq, a regeneration requiring accumulation amount by Mnrm, and a base accumulation amount by Mbase, a parameter for execution frequency of regeneration can be given by Freq'=(Mreq-Mbase)/(Mnrm-Mbase). In this case, the diagnosis unit may diagnose that abnormality is occurring in the filter regeneration system causing excessive execution frequency of the regeneration process, when the parameter for execution frequency of regeneration Freq' is smaller than a pre-determined criterion value.

In the above case, as in the first invention, if a regeneration process is executed by reason that the pressure upstream of the filter or the differential pressure across the filter reaches a regeneration requiring value, the parameter for execution frequency of regeneration Freq is less than 1 (Freq<1). In this case the pre-determined criterion value is a value determined by a similar basis used for the criterion value according to the first invention.

According to the first and second inventions, an average calculation unit may be further provided, for calculating an average value of the parameter for execution frequency of regeneration when the regeneration process is executed a pre-determined number of times. In this case, the diagnosis unit may diagnose whether or not abnormality is occurring in the filter regeneration system causing excessive execution frequency of the regeneration process, based on the average value of the parameter for execution frequency of regeneration calculated by the average calculation unit.

At an occurrence of a certain type of abnormality in the filter regeneration system, depending on the type of the abnormality, the parameter for execution frequency of regeneration may not exhibit an abnormal value at each execution of the regeneration process. Even in case such type of abnormality should occur, the abnormality can be detected according to the above measures.

Furthermore, in the above case, the pre-determined number of times may be so decided that the parameter for execution frequency of regeneration exhibits a value indicating abnormality at any one of the executions of the regeneration process repeated the pre-determined number of times, insofar as abnormality occurs in the filter regeneration system irrespective of the type of the abnormality.

Further, the pre-determined number of times may be decided as a number of the times of executions of the regeneration process executed from a previous abnormality diagnosis in the filter regeneration system until a travel distance of a vehicle equipped with an internal combustion engine reaches a pre-determined travel distance. In this case, the pre-determined travel distance is so decided, that the parameter for execution frequency of regeneration exhibits a value indicating abnormality at any one of the executions of the regeneration process to be carried out during the vehicle's travelling the distance in question, insofar as abnormality occurs in the filter regeneration system irrespective of the type of the abnormality.

A method for diagnosing abnormality in a filter regeneration system according to the third invention of the present invention is characterized in:

that the filter regeneration system executes a regeneration process of a particulate filter placed in an exhaust passage of an internal combustion engine; and comprises:

an accumulation amount estimation unit for estimating an accumulation amount of particulate matter at the particulate filter;

a pressure determination unit for determining a pressure upstream of the particulate filter in the exhaust passage or a differential pressure across the particulate filter; and an execution unit for the regeneration process for executing the regeneration process to oxidize and remove the particulate matter accumulated at the particulate filter; and initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount, characterized in that the method for diagnosing abnormality in the filter regeneration system comprises:

a step for calculating a ratio of an accumulation amount of the particulate matter at the initiation of the execution of the regeneration process estimated by the accumulation amount estimation unit to the regeneration requiring accumulation amount, as a parameter for execution frequency of regeneration; and a step for diagnosing based on the parameter for execution frequency of regeneration whether or not abnormality is occurring in the filter regeneration system causing excessive execution frequency of the regeneration process.

A method for diagnosing abnormality in a filter regeneration system according to the fourth invention of the present invention, is characterized in:

that the filter regeneration system executes a regeneration process of a particulate filter placed in an exhaust passage of an internal combustion engine; and comprises:

an accumulation amount estimation unit for estimating an accumulation amount of particulate matter at the particulate filter;

a pressure determination unit for determining a pressure upstream of the particulate filter in the exhaust passage or a differential pressure across the particulate filter; and an execution unit for the regeneration process for executing the regeneration process to oxidize and remove the particulate matter accumulated at the particulate filter; and initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount; and terminates the execution of the regeneration process, in case, after the initiation of the execution of the regeneration process, the accumulation amount of the particulate matter at the particulate filter is judged to have decreased to a pre-determined base accumulation amount, characterized in that the method for diagnosing abnormality in the filter regeneration system comprises:

initiates execution of the regeneration process by the execution unit for the regeneration process, a step for calculating a ratio of:

the difference between an accumulation amount of the particulate matter at the initiation of the execution of the regeneration process estimated by the accumulation amount estimation unit and the base accumulation amount to the difference between the regeneration requiring accumulation amount and the base accumulation amount, as a parameter for execution frequency of regeneration; and a step for diagnosing based on the parameter for execution frequency of regeneration whether or not abnormality is occurring in the filter regeneration system causing excessive execution frequency of the regeneration process.

According to the third and fourth invention inventions, as in the first and second inventions, whether or not abnormality occurs in the filter regeneration system causing excessive execution frequency of the regeneration process can be diagnosed with higher accuracy.

Effect of the Invention

According to the present invention, whether or not abnormality occurs in the filter regeneration system causing excessive execution frequency of the regeneration process can be diagnosed with higher accuracy.

Figure 1:
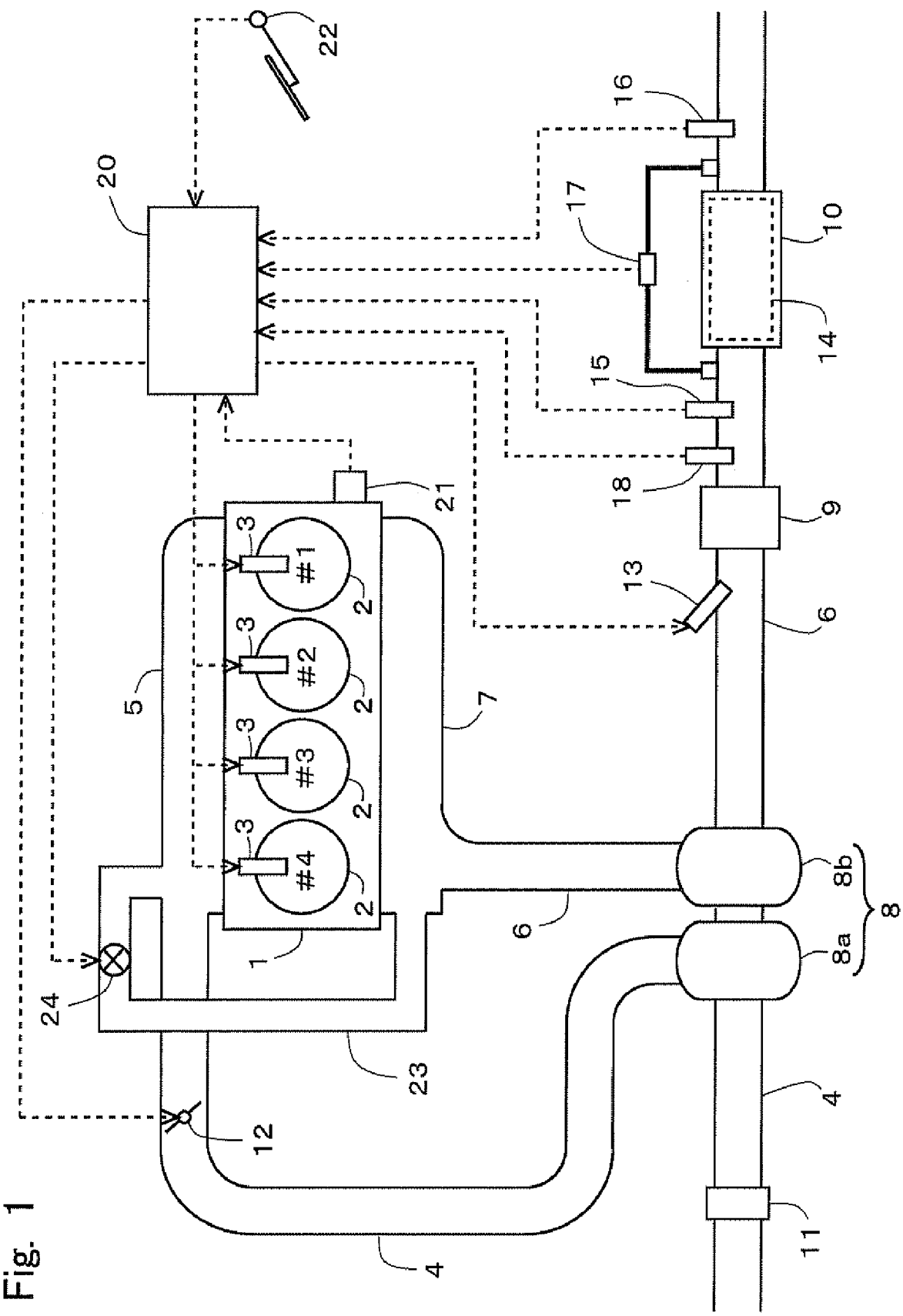
FIG. 1 is a schematic representation of an outline constitution of an internal combustion engine and an intake-exhaust system thereof pursuant to Embodiment 1.

DESCRIPTION OF SYMBOLS 1. internal combustion engine
2. cylinder
4. intake passage
6. exhaust passage 9. oxidation catalyst
10. particulate filter
13. fuel addition valve
14. NOx storage reduction catalyst
15. upstream temperature sensor
16. downstream temperature sensor
17. differential pressure sensor
20. ECU
21. crank position sensor
22. accelerator sensor

BEST MODE FOR CARRYING OUT THE INVENTION

Specific embodiments of the abnormality diagnosis system and method for diagnosing abnormality in the filter regeneration system according to the present invention will now be described with reference to the figures. The sizes, materials, shapes, relative arrangements and the like of the components described in the following embodiments are not intended to limit the technical scope of the invention solely thereto, unless otherwise specifically set forth herein.

Embodiment 1

Outline Constitution of Internal Combustion Engine and Intake-Exhaust System Thereof FIG. 1 is a schematic representation of an outline constitution of an internal combustion engine and an intake-exhaust system thereof pursuant to the present embodiment. The internal combustion engine 1 is a diesel engine for driving a vehicle and has 4 cylinders 2. Each cylinder 2 is provided with a fuel injection valve 3 for injecting a fuel directly into the cylinder 2.

The internal combustion engine 1 is connected with an intake manifold 5 and an exhaust manifold 7. The intake manifold 5 is connected with an end of the intake passage 4. The exhaust manifold 7 is connected with an end of the exhaust passage 6.

The intake passage 4 is provided with a compressor housing 8a of a turbocharger 8. The exhaust passage 6 is provided with a turbine housing 8b of the turbocharger 8. While, the intake manifold 5 and the exhaust manifold 7 are interconnected by an EGR passage 23. The EGR passage 23 is provided with an EGR valve 24 to regulate the flow rate of the EGR gas.

An air flowmeter 11 is provided in the intake passage 4 upstream of the compressor housing 8a. A throttle valve 12 is provided in the intake passage 4 downstream of the compressor housing 8a.

An oxidation catalyst 9 is provided in the exhaust passage 6 downstream of the turbine housing 8b. A filter 10 for trapping the PM in the exhaust gas is provided in the exhaust passage 6 downstream of the oxidation catalyst 9. The filter 10 carries a NOx storage reduction catalyst 14. A fuel addition valve 13 for adding a fuel into the exhaust gas as a reducing agent is provided in the exhaust passage 6 downstream of the turbine housing 8b and upstream of the oxidation catalyst 9.

An oxygen concentration sensor 18 and an upstream temperature sensor 15 are provided in the exhaust passage 6 downstream of the oxidation catalyst 9 and upstream of the filter 10. A downstream temperature sensor 16 is provided in the exhaust passage 6 downstream of the filter 10. Further, a differential pressure sensor 17 for measuring the differential pressure across the filter 10 is provided in the exhaust passage 6.

An electronic control unit (ECU) 20 is annexed to the internal combustion engine 1. The ECU 20 is a unit for regulating operation conditions of the internal combustion engine 1. The ECU 20 is electrically connected with the air flowmeter 11, the oxygen concentration sensor 18, the upstream temperature sensor 15, the downstream temperature sensor 16, the differential pressure sensor 17, a crank position sensor 21, and an accelerator position sensor 22. The crank position sensor 21 detects the crank angle of the internal combustion engine 1. The accelerator position sensor 22 detects the accelerator pedal angle of a vehicle equipped with the internal combustion engine 1. Output signals of the respective sensors are input to the ECU 20.

The ECU 20 derives the temperature of the filter 10 from the output values of the upstream temperature sensor 15 and the downstream temperature sensor 16. The ECU 20 derives the engine rotation speed from the output values of the crank position sensor 21. The ECU 20 derives the engine load on the internal combustion engine 1 from the output value of the accelerator position sensor 22.

The respective fuel injection valves 3, the throttle valve 12, the EGR valve 24 and the fuel addition valve 13 are electrically connected with the ECU 20 and regulated by the ECU 20.

(Regeneration Process)

According to the present embodiment, a regeneration process is executed to remove the PM accumulated at the filter 10. The regeneration process is carried out by adding the fuel through the fuel addition valve 13. The fuel added through the fuel addition valve 13 is fed to the oxidation catalyst 9 and the NOx storage reduction catalyst 14, and oxidized by the catalysts. In such case, the temperature of the filter 10 is raised by the generated oxidation heat, so that the PM is oxidized and removed.

In the regeneration process, the fuel addition amount through the fuel addition valve 13 is so regulated that the temperature of the filter 10 is controlled to a target temperature to be decided as a temperature, at which oxidation of the PM is possible and erosion or breakage of the filter 10 can be suppressed. Moreover, instead of the fuel addition through the fuel addition valve 13, an auxiliary fuel injection through the fuel injection valves 3 of the internal combustion engine 1 may be carried out at a pre-determined timing to feed the fuel to the oxidation catalyst 9 and the NOx storage reduction catalyst 14.

Figure 2:
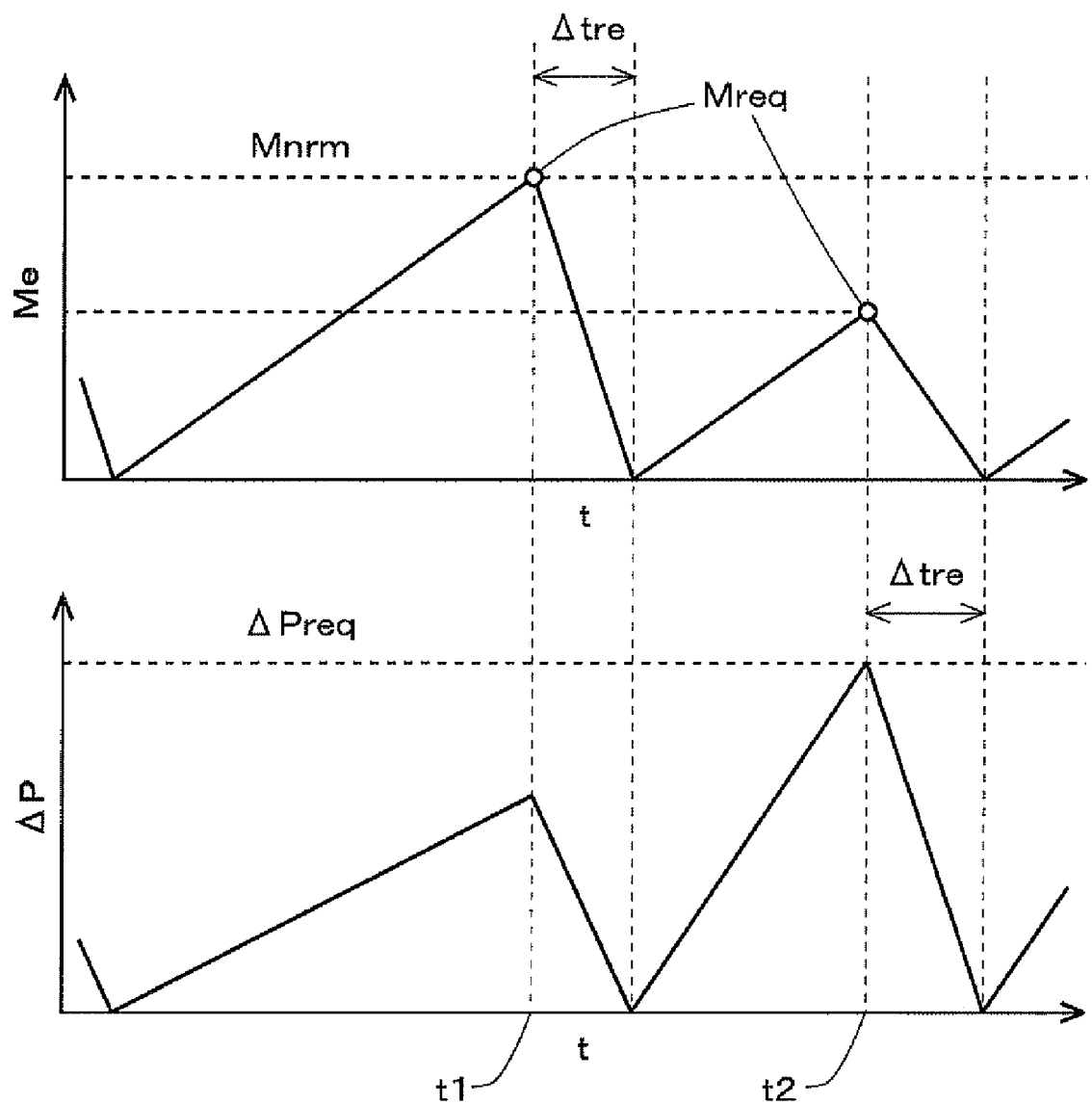
FIG. 2 is graphs showing the time courses of the estimated PM accumulation amount and the upstream/downstream differential pressure pursuant to Embodiment 1.

Now, the timings of initiation and termination of the execution of the regeneration process pursuant to the present embodiment will be described with reference to FIG. 2. FIG. 2 is graphs showing the time courses of the estimated PM accumulation amount at the filter 10 (hereinafter referred to simply as the "estimated PM accumulation amount") Me and the differential pressure across the filter 10 (hereinafter referred to simply as the "differential pressure") ΔP pursuant to the present embodiment. The estimated PM accumulation amount Me is calculated by the ECU 20 based on the history of the operation conditions of the internal combustion engine 1, the temperature of the filter 10, and the like, since the termination of the previous regeneration process. The differential pressure ΔP is a measured value of the differential pressure sensor 17.

The differential pressure ΔP increases in accordance with the increase of the PM accumulation amount at the filter 10. Pursuant to the present embodiment, the execution of the regeneration process is initiated, when the estimated PM accumulation amount Me reaches a pre-determined regeneration requiring accumulation amount Mnrm, or the differential pressure ΔP reaches a pre-determined regeneration requiring differential pressure ΔPreq.

The pre-determined regeneration requiring accumulation amount Mnrm and regeneration requiring differential pressure ΔPreq are values smaller than such PM accumulation amount or differential pressure, as increases the back pressure beyond the allowable range of the effect on the operation of the internal combustion engine 1, etc. The regeneration requiring differential pressure ΔPreq is a value larger than the differential pressure corresponding to the regeneration requiring accumulation amount Mnrm.

In other words, the estimated PM accumulation amount Me reaches the regeneration requiring accumulation amount Mnrm, before the differential pressure ΔP reaches the regeneration requiring differential pressure ΔPreq. Consequently, normally as the timing represented by t1 in FIG. 2, the execution of the regeneration process is initiated, when the estimated PM accumulation amount Me reaches the regeneration requiring accumulation amount Mnrm.

However, in case some abnormality should occur in the filter regeneration system, the differential pressure ΔP reaches occasionally the regeneration requiring differential pressure ΔPreq, before the estimated PM accumulation amount Me reaches the regeneration requiring accumulation amount Mnrm. In such a case, as the timing represented by t2 in FIG. 2, the execution of the regeneration process is initiated, when the differential pressure ΔP reaches the regeneration requiring differential pressure ΔPreq.

While, the initiated execution of the regeneration process is terminated pursuant to the present embodiment, when a regeneration process execution time $\Delta_{tre}$ calculated by the ECU20 has expired. The regeneration process execution time $\Delta_{tre}$ is a time duration, in which the PM accumulation amount at the filter 10 is judged to be reduced to a possible minimal amount.

In case the execution of the regeneration process is initiated by reason that the estimated PM accumulation amount Me has reached the regeneration requiring accumulation amount Mnrm, the regeneration process execution time $\Delta_{tre}$ is calculated based on the regeneration requiring accumulation amount Mnrm and the flow rate, oxygen concentration, etc. of the exhaust gas flown into the filter 10; and in case the execution of the regeneration process is initiated by reason that the differential pressure ΔP has reached the regeneration requiring differential pressure ΔPreq, the same is calculated based on the regeneration requiring differential pressure ΔPreq, and the flow rate, oxygen concentration, etc. of the exhaust gas flown into the filter 10.

(Regeneration Process Flow)

Figure 3:
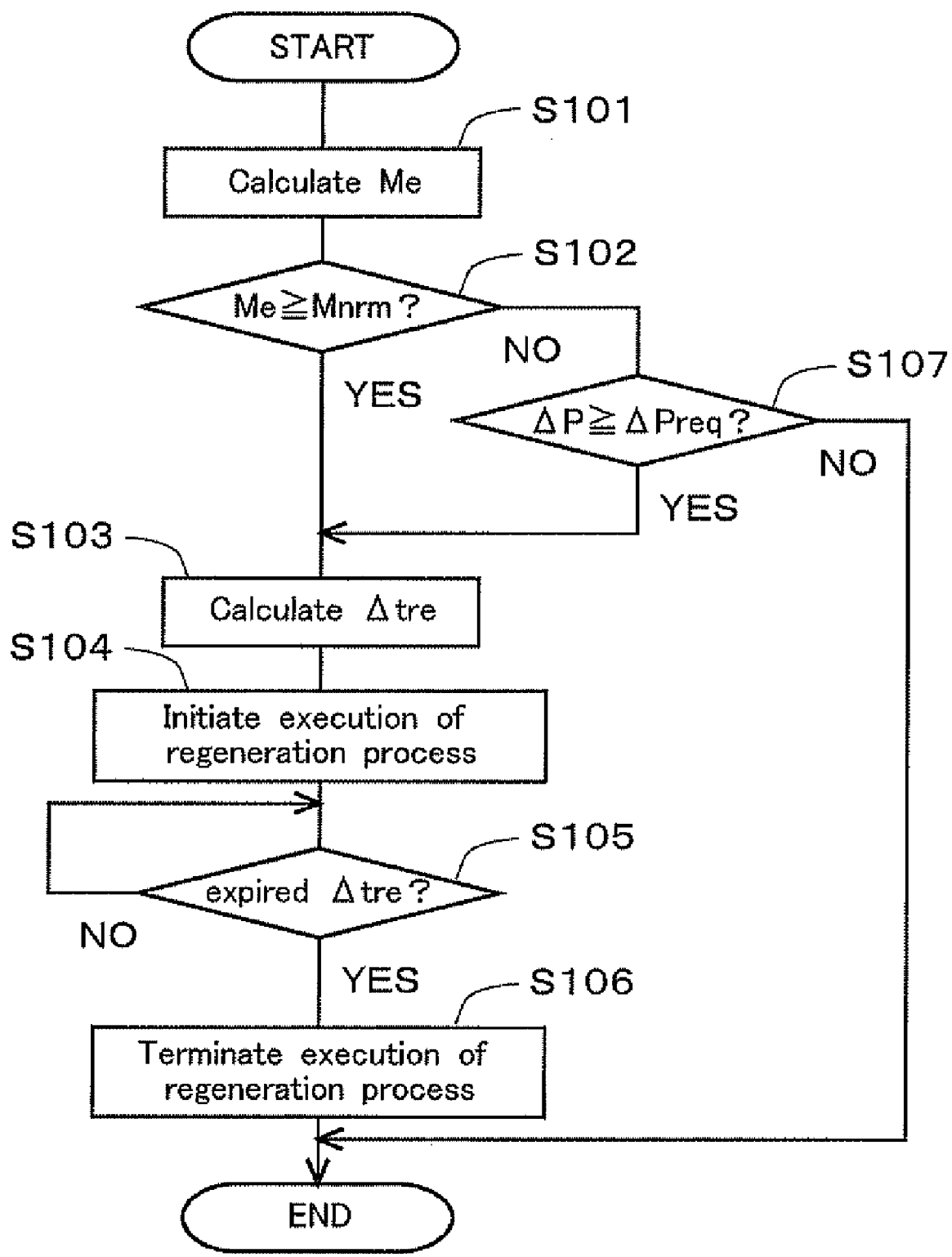
FIG. 3 is a flowchart of the regeneration process flow pursuant to Embodiment 1.

The regeneration process flow pursuant to the present embodiment will be described with reference to the flowchart shown in FIG. 3. The flow is stored in advance in the ECU 20 and executed by the ECU 20.

According to the flow, initially at the step S101, the estimated PM accumulation amount Me is calculated.

Next, at the step S102, whether or not the estimated PM accumulation amount Me has reached the regeneration requiring accumulation amount Mnrm is discriminated. If affirmatively judged at the step S102, then the task of the step S103 is executed; and if negatively judged, then the task of the step S107 is executed.

At the step S107, whether or not the differential pressure ΔP has reached the regeneration requiring differential pressure ΔPreq is discriminated. At this step S107, negative judgment is normal, and in this case the execution of the flow is terminated. However, if some abnormality should occur in the filter regeneration process system, the step S107 occasionally judges affirmatively.

At the step S103, the regeneration process execution time $\Delta_{tre}$ is calculated for the execution that is initiated at the next step S104.

Next, at the step S104, the execution of the regeneration process is initiated.

Next, at the step S105, whether or not the regeneration process execution time $\Delta_{tre}$ has expired since the initiation of the execution of the regeneration process is discriminated. If affirmatively judged at the step S105, the execution of the regeneration process is terminated at the step S106.

Meanwhile, the ECU 20, which executes the task of the step S101 of the regeneration process flow, is equivalent to the accumulation amount estimation unit according to the present invention. Further, the differential pressure sensor 17 is equivalent to the pressure determination unit according to the present invention, and the ECU 20, which executes the regeneration process by adding the fuel through the fuel addition valve 13, is equivalent to the execution unit for the regeneration process according to the present invention.

Further, pursuant to the present embodiment, instead of the differential pressure across the filter 10, the pressure in the exhaust passage 6 upstream of the filter 10 may be used as a criterion value for initiation of the execution of the regeneration process. In this case, when the pressure in the exhaust passage 6 upstream of the filter 10 reaches a regeneration requiring pressure, the execution of the regeneration process is initiated. The regeneration requiring pressure is higher than the differential pressure corresponding to the regeneration requiring accumulation amount Mnrm.

(Relationship Between Execution Frequency of Regeneration Process and Exhaust Emissions)

In case, as described above, some abnormality should occur in the filter regeneration system, and the execution of the regeneration process is initiated by reason that the differential pressure ΔP reaches the regeneration requiring differential pressure ΔPreq, the execution of the regeneration process is initiated earlier than in a normal state. Consequently, the execution frequency of the regeneration process becomes higher. In this case compared to a normal state, where the execution of the regeneration process will be initiated by reason that the estimated PM accumulation amount Me reaches the regeneration requiring accumulation amount Mnrm, the execution of the regeneration process is initiated at a stage that the actual PM accumulation amount is still at lower level.

Figure 4:
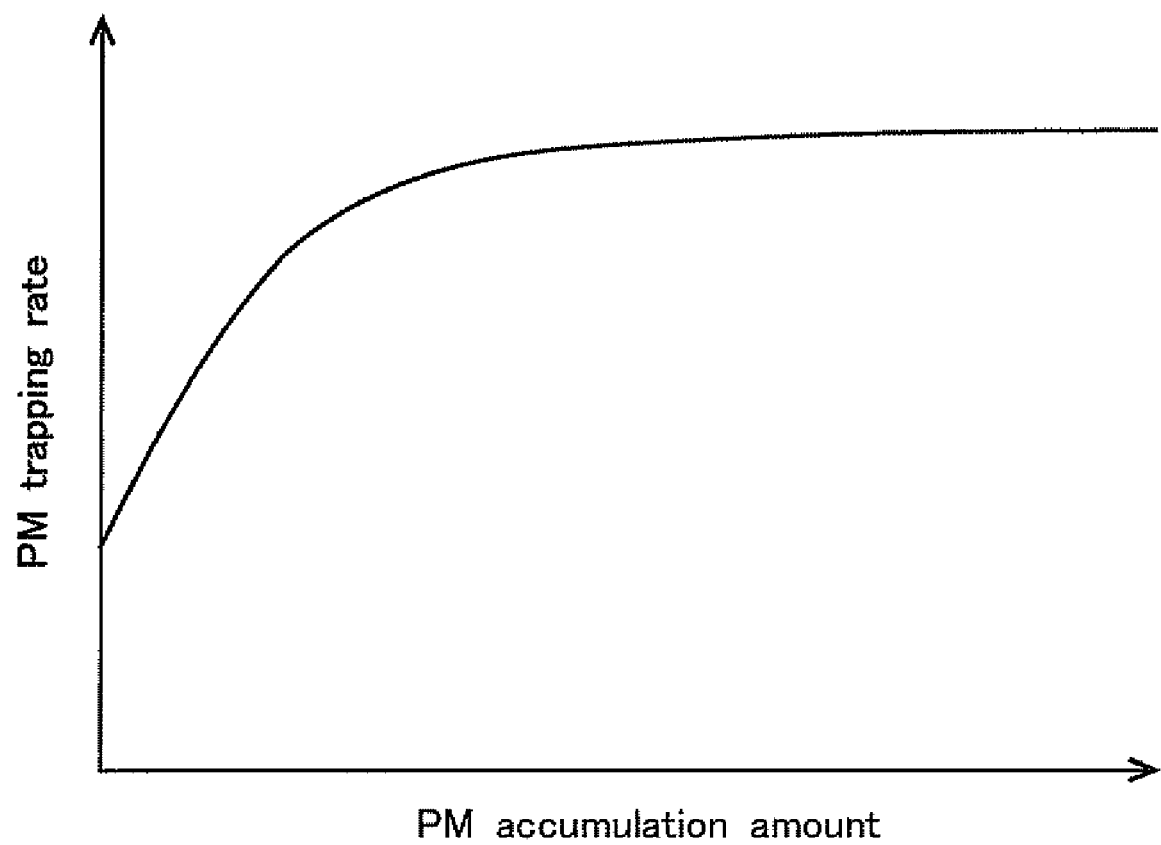
FIG. 4 is a graph showing the relationship between the PM trapping rate of the filter and the PM accumulation amount at the filter.

FIG. 4 is a graph showing the relationship between the PM trapping rate of the filter 10 and the PM accumulation amount at the filter 10. In FIG. 4, the vertical axis represents the PM trapping rate of the filter 10 and the horizontal axis represents the PM accumulation amount at the filter 10. As shown in FIG. 4, the PM trapping rate of the filter 10 is lower at a low PM accumulation amount than at a high PM accumulation amount.

If the execution frequency of the regeneration process becomes higher, the frequency that the PM accumulation amount at the filter 10 stays in the range where the PM trapping rate of the filter 10 is relatively low, becomes also higher. Consequently, the rate of the PM that passes through the filter 10 increases.

Further, since the temperature of the filter 10 rises during the execution of the regeneration process, the degradation of the NOx storage reduction catalyst 14 carried on the filter 10 is accelerated by frequent execution of the regeneration process. As the result, the NOx storage reduction ability or the oxidation ability of the NOx storage reduction catalyst 14 is compromised.

Furthermore, since the temperature of the NOx storage reduction catalyst 14 also rises during the execution of the regeneration process, the storage of NOx in the NOx storage reduction catalyst 14 becomes difficult during such execution. As the result, more NOx is emitted without being stored and reduced by the NOx storage reduction catalyst 14.

As described above, in case some abnormality should occur in the filter regeneration system leading to excessive execution frequency of the regeneration process, the overall nature of exhaust emissions may be aggravated. Consequently, pursuant to the present embodiment, whether or not abnormality occurs in the filter regeneration system causing excessive execution frequency of the regeneration process is diagnosed based on a parameter for execution frequency of regeneration to be described below.

(Diagnosis of Abnormality in Filter Regeneration System)

The estimated PM accumulation amount at the initiation of the regeneration is represented by Mreq. As shown in FIG. 2, in a normal state, where the execution of the regeneration process is initiated by reason that the estimated PM accumulation amount Me reaches the regeneration requiring accumulation amount Mnrm, the relation Mreq=Mnrm holds logically. While, in case the execution of the regeneration process is initiated by reason that the differential pressure ΔP reaches the regeneration requiring differential pressure ΔPreq, the relation Mreq<Mnrm holds.

So, pursuant to the present embodiment, a parameter for execution frequency of regeneration is calculated as Freq=Mreq/Mnrm. The value of the parameter for execution frequency of regeneration Freq is 1 in a normal state. While, in case the execution of the regeneration process is initiated by reason that the differential pressure ΔP reaches the regeneration requiring differential pressure ΔPreq, namely, in case the execution frequency of the regeneration process is higher than in a normal state, the value of the parameter for execution frequency of regeneration Freq is less than 1.

Figure 5:
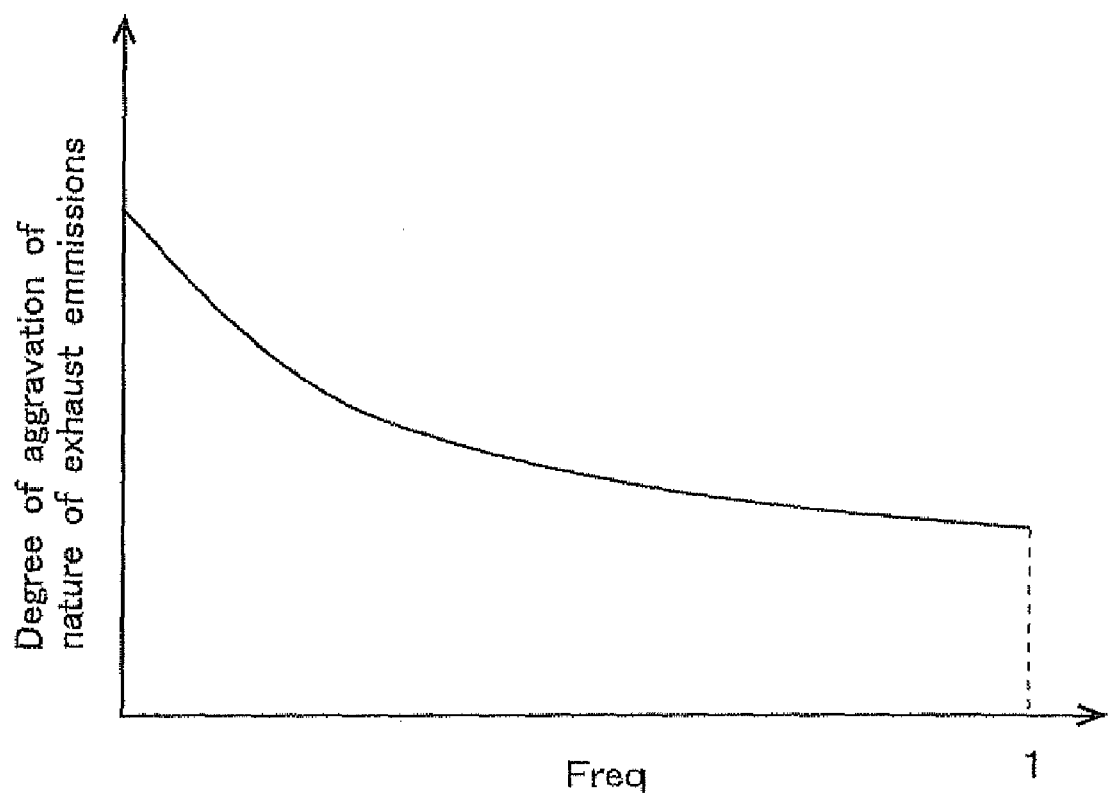
FIG. 5 is the first graph showing the relationship between a parameter for execution frequency of regeneration and the degree of aggravation of the nature of exhaust emissions pursuant to Embodiment 1.

The relationship between the parameter for execution frequency of regeneration Freq and the degree of aggravation of the nature of exhaust emissions will be described with reference to FIG. 5 and FIG. 6. In FIG. 5, the vertical axis represents the degree of aggravation of the nature of exhaust emissions in connection with the PM trapping rate of the filter 10. While, in FIG. 6, the vertical axis represents the degree of aggravation of the nature of exhaust emissions in connection with the execution of the regeneration process. The horizontal axes in FIG. 5 and FIG. 6 represent the parameter for execution frequency of regeneration Freq.

In case the parameter for execution frequency of regeneration Freq becomes small, the frequency that the PM accumulation amount stays in the range where the PM trapping rate is relatively low becomes higher, and therefore the degree of aggravation of the nature of exhaust emissions becomes higher in connection therewith as shown in FIG. 5. While, as shown in FIG. 6, in case the parameter for execution frequency of regeneration Freq becomes small, due to acceleration of degradation of the NOx storage reduction catalyst 14 and increase in occasions of poorer storage of NOx in the NOx storage reduction catalyst 14, the degree of aggravation of the nature of exhaust emissions in connection with the execution of the regeneration process becomes higher.

Figure 6:
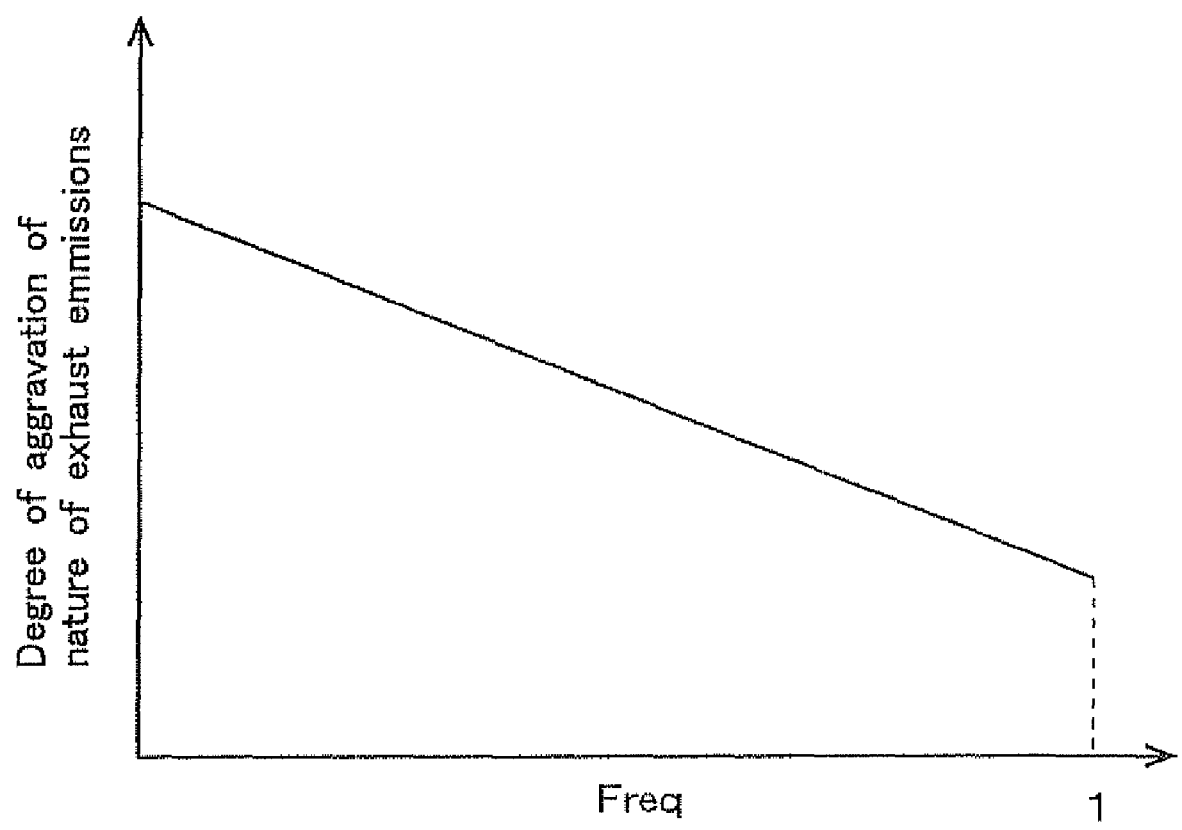
FIG. 6 is the second graph showing the relationship between a parameter for execution frequency of regeneration and the degree of aggravation of the nature of exhaust emissions pursuant to Embodiment 1.
Figure 7:
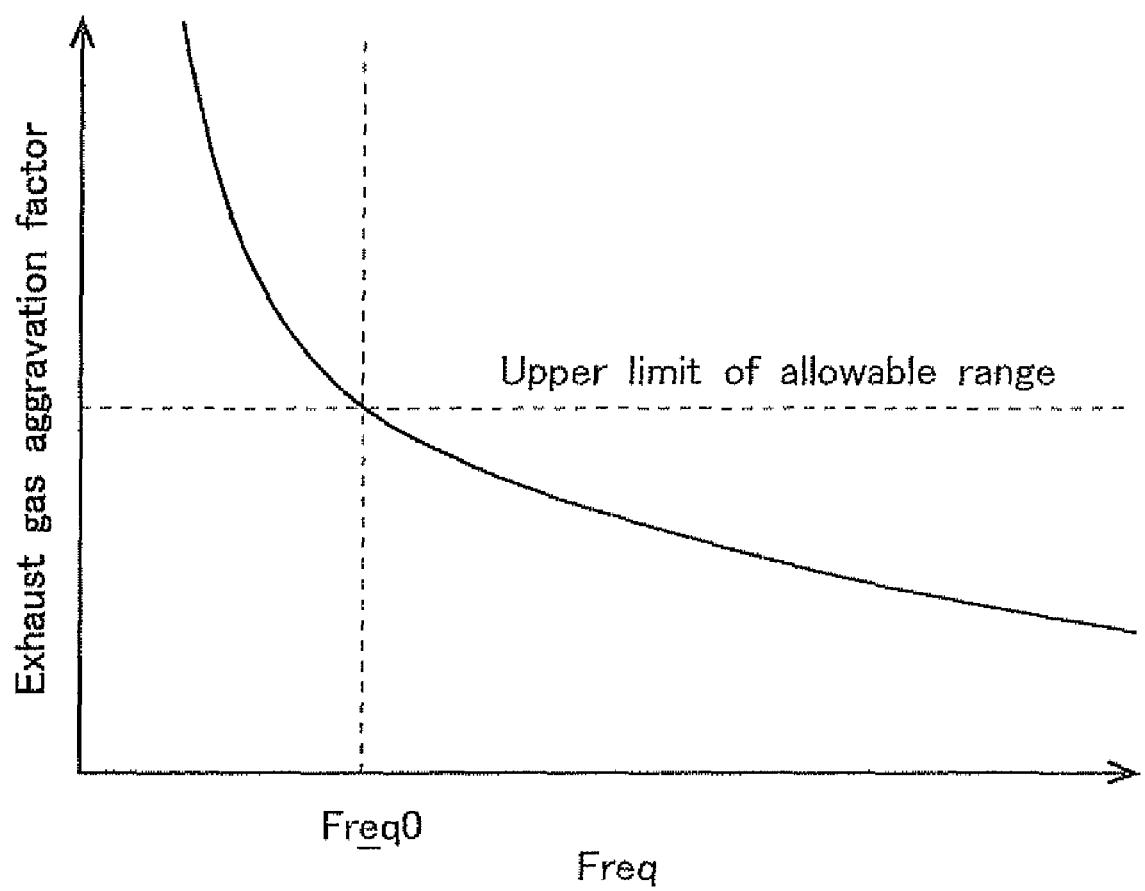
FIG. 7 is a graph showing the relationship between a parameter for execution frequency of regeneration and the exhaust gas aggravation factor pursuant to Embodiment 1.

Now, a value taking into consideration features of both the degree of aggravation of the nature of exhaust emissions shown in FIG. 5 and FIG. 6 is used as an exhaust gas aggravation factor. The relationship between the exhaust gas aggravation factor and the parameter for execution frequency of regeneration Freq becomes as shown in FIG. 7. In FIG. 7 the vertical axis represents the exhaust gas aggravation factor, and the horizontal axis represents the parameter for execution frequency of regeneration Freq. The relationship can be found through an experiment, etc.

A value of the parameter for execution frequency of regeneration Freq, at which the exhaust gas aggravation factor coincides with the upper limit of an allowable range thereof, is determined as a pre-determined criterion value Freq0. As the result, in case a parameter for execution frequency of regeneration Freq is below the pre-determined criterion value Freq0, it can be so judged that abnormality is occurring in the filter regeneration system causing execution frequency of the regeneration process so high as to aggravate the nature of exhaust emissions beyond the limit of the allowable range.

(Flow for Diagnosis of Abnormality in Filter Regeneration System)

Figure 8:
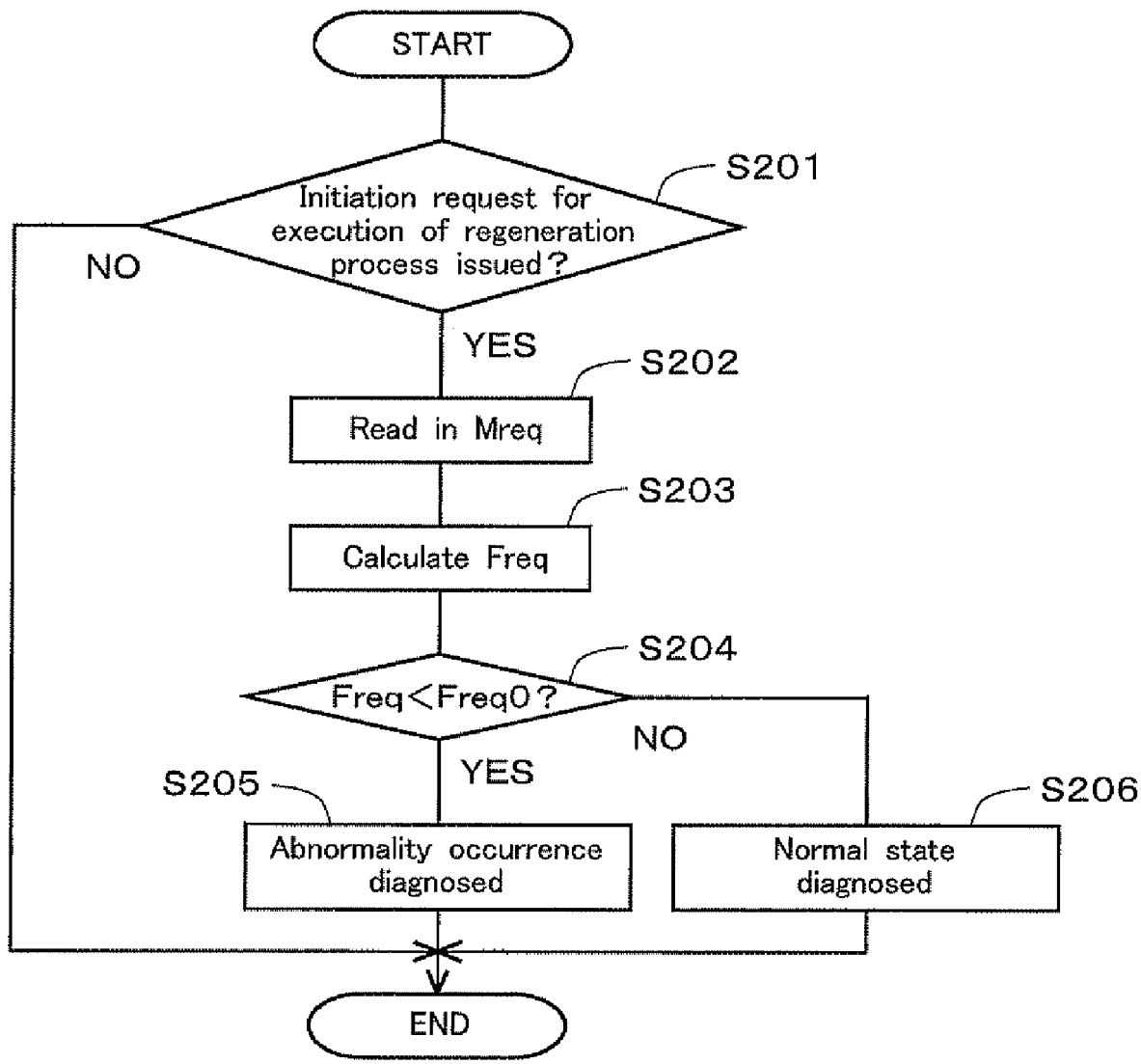
FIG. 8 is a flowchart of the abnormality diagnosis flow in the filter regeneration system pursuant to Embodiment 1.

The flow for diagnosis of abnormality in the filter regeneration system pursuant to the present embodiment will be described with reference to the flow chart shown in FIG. 8. The flow is stored in advance in the ECU 20 and executed by the ECU 20.

According to the flow, initially at the step S201, it is discriminated whether or not an initiation request for the execution of the regeneration process has been issued. The initiation request for the execution of the regeneration process is issued when the estimated PM accumulation amount Me reaches the regeneration requiring accumulation amount Mnrm, or the differential pressure ΔP reaches the regeneration requiring differential pressure ΔPreq. If affirmatively judged at the step S201, then the task of the step S202 is executed.

At the step S202, the estimated PM accumulation amount at the initiation of the regeneration Mreq is read in.

Next, at the step S203, the parameter for execution frequency of regeneration Freq is calculated from the estimated PM accumulation amount at the initiation of the regeneration Mreq read in at the step S202 and the regeneration requiring accumulation amount Mnrm.

Next, at the step S204, it is discriminated whether or not the parameter for execution frequency of regeneration Freq is smaller than a pre-determined criterion value Freq0.

If affirmatively judged at the step S204, next at the step S205 it is so diagnosed that abnormality is occurring in the filter regeneration system causing excessive execution frequency of the regeneration process. If negatively judged at the step S204, next at the step S206 it is so diagnosed that the filter regeneration system is in a normal state.

The parameter for execution frequency of regeneration Freq pursuant to the present embodiment is a value that varies due to the shift of the initiation timing of the execution of the regeneration process from the normal timing, in case abnormality occurs in the filter regeneration system. However, the parameter for execution frequency of regeneration Freq is not a value that varies in accordance with operation conditions of the internal combustion engine between the previous termination time of the regeneration process and the current initiation time of the regeneration process.

Consequently, as described above, by diagnosing abnormality based on the parameter for execution frequency of regeneration Freq pursuant to the present embodiment, whether or not abnormality occurs in the filter regeneration system causing excessive execution frequency of the regeneration process can be diagnosed with higher accuracy.

Meanwhile, the ECU 20, which executes the task of the step S203 of the abnormality diagnosis flow, is equivalent to the parameter calculation unit according to the present invention. Further, the ECU 20, which executes the tasks of the steps S203 through S206 of the abnormality diagnosis flow is equivalent to the diagnosis unit according to the present invention.

Embodiment 2

An outline constitution of an internal combustion engine and an intake-exhaust system thereof pursuant to the present embodiment is similar to Embodiment 1.

(Regeneration Process)

Figure 9:
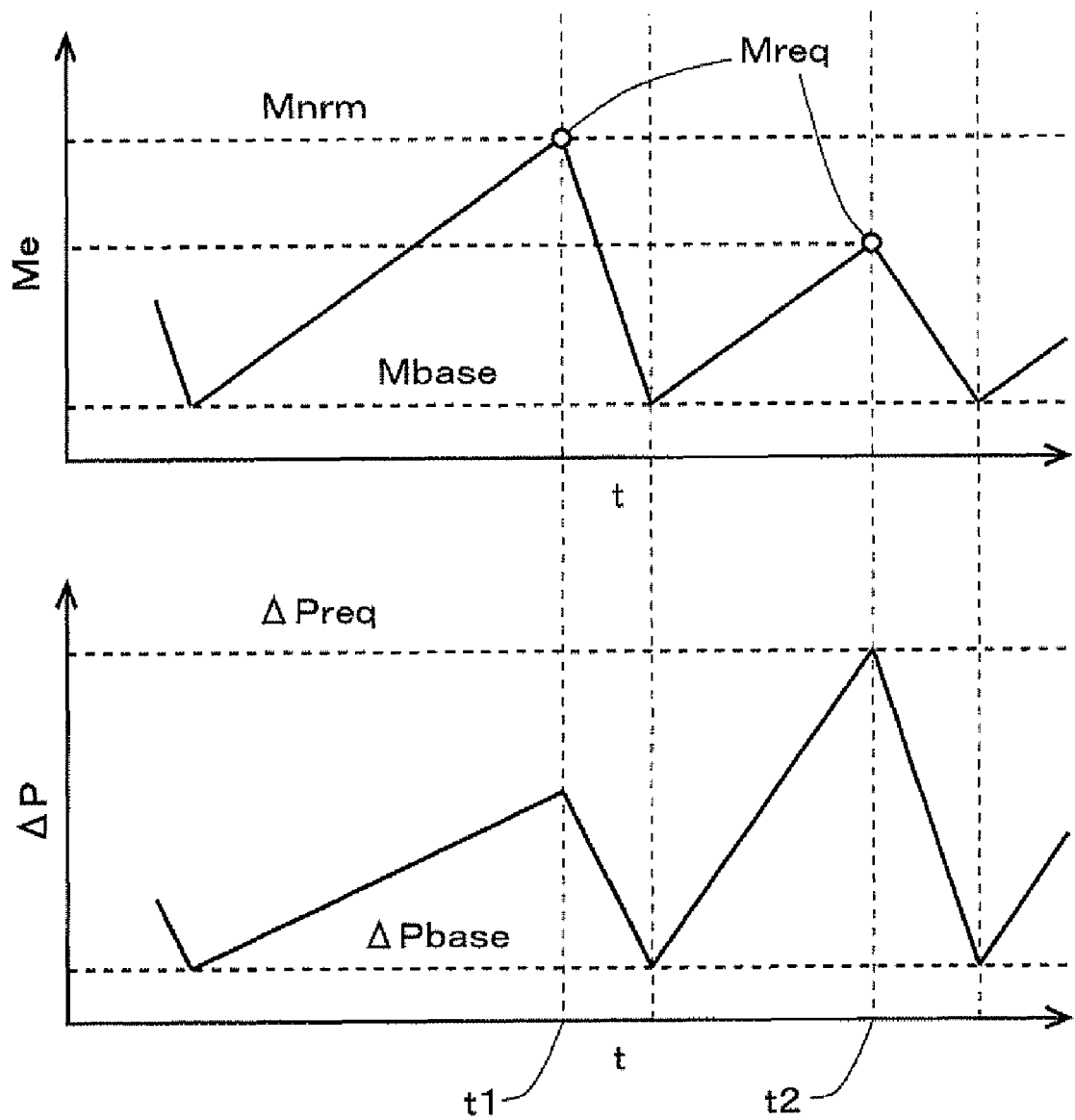
FIG. 9 is graphs showing the time courses of the estimated PM accumulation amount and the upstream/downstream differential pressure pursuant to Embodiment 2.

Pursuant to the present embodiment, as in Embodiment 1, the regeneration process is carried out by adding the fuel through the fuel addition valve 13. Now, the timings of initiation and termination of the execution of the regeneration process pursuant to the present embodiment will be described with reference to FIG. 9. FIG. 9 is graphs showing the time courses of the estimated PM accumulation amount Me and the differential pressure $\Delta P$ pursuant to the present embodiment.

The initiation timing of the execution of the regeneration process pursuant to the present embodiment is similar to Embodiment 1. Namely, the execution of the regeneration process is initiated, when the estimated PM accumulation amount Me reaches a pre-determined regeneration requiring accumulation amount Mnrm (t1 in FIG. 9), or the differential pressure $\Delta P$ reaches a pre-determined regeneration requiring differential pressure $\Delta$Preq (t2 in FIG. 9).

However, the termination timing of the execution of the regeneration process is different from Embodiment 1. Pursuant to the present embodiment, in order to suppress deterioration of the fuel economy by the execution of the regeneration process, the execution of the regeneration process is terminated, when the PM accumulation amount at the filter 10 is judged to have decreased to a pre-determined base accumulation amount Mbase after the initiation of the execution of the regeneration process.

More particularly, in case the execution of the regeneration process is initiated by reason that an estimated PM accumulation amount Me reaches a regeneration requiring accumulation amount Mnrm, a decrease in the PM accumulation amount since the initiation of the execution of the regeneration process is estimated. Then, when the value obtained by subtracting the decrease from the regeneration requiring accumulation amount Mnrm reaches the base accumulation amount Mbase, the execution of the regeneration process is terminated. Meanwhile, in case the execution of the regeneration process is initiated by reason that the differential pressure $\Delta P$ reaches the regeneration requiring differential pressure $\Delta$Preq, the execution of the regeneration process is terminated, when the differential pressure $\Delta P$ reaches the base differential pressure $\Delta$Pbase that is a differential pressure corresponding to the base accumulation amount Mbase.

The pre-determined base accumulation amount Mbase above means an amount larger than the lowest PM accumulation amount attainable by the regeneration process, and from which certain time allowance is judged to be available until the PM accumulation amount increases again to a regeneration requiring threshold value. The pre-determined base accumulation amount Mbase is determined in advance according to an experiment, etc.

(Regeneration Process Flow)

Figure 10:
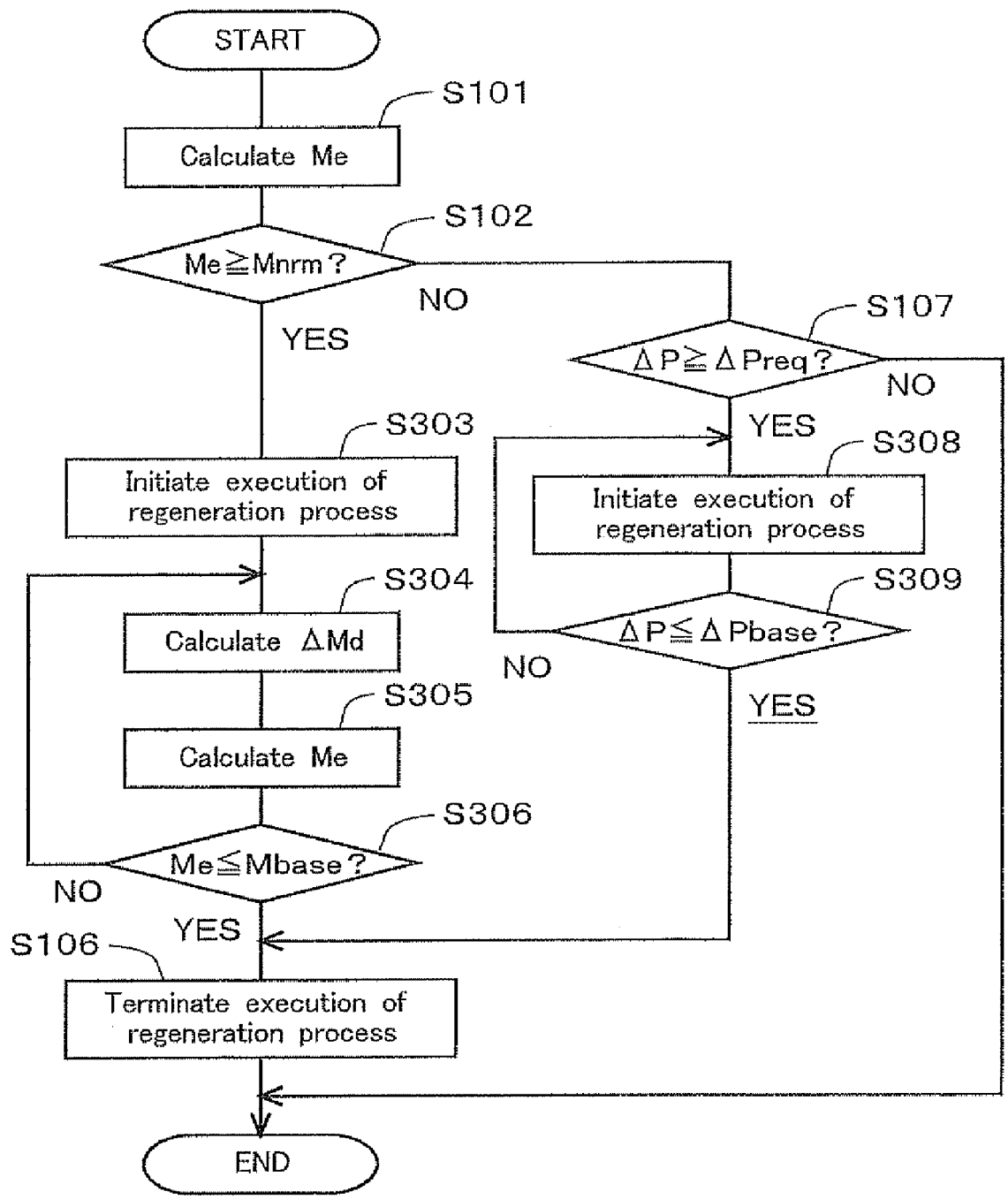
FIG. 10 is a flowchart of the regeneration process flow pursuant to Embodiment 2.

The regeneration process flow pursuant to the present embodiment will be described with reference to the flow chart shown in FIG. 10. The flow is stored in advance in the ECU 20 and executed by the ECU 20. Since the tasks of the steps S101, S102, S106 and S107 of this flow are same as in the flow in FIG. 3, the descriptions will not be reiterated.

Pursuant to the present flow, if affirmatively judged at the step S102, next the task of S303 is executed. At the step S303, the execution of the regeneration process is initiated.

Then at the step S304, a decrease $\Delta$Md in the PM accumulation amount after the initiation of the execution of the regeneration process is calculated. The decrease $\Delta$Md is calculated based on the flow rate, oxygen concentration, etc. of the exhaust gas flown into the filter 10, the temperature of the filter 10, and the like during the execution of the regeneration process.

Next, at the step S305, a currently applicable estimated PM accumulation amount Me can be calculated by subtracting the decrease $\Delta$Md in the PM accumulation amount calculated at the step S304 from the regeneration requiring accumulation amount Mnrm.

Next, at the step S306, whether or not the estimated PM accumulation amount Me calculated at the step S305 has decreased to or below the base accumulation amount Mbase is discriminated. If affirmatively judged at the step S306, then the task of the step S106 is executed. While, if negatively judged at the step S306, the task of the step S304 is repeated.

Further, according to the present flow, if affirmatively judged at the step S107, then the task of the step S308 is executed. At the step S308, the execution of the regeneration process is initiated.

Next, at the step S309, whether or not the current differential pressure $\Delta P$ has decreased to or below the base differential pressure $\Delta$Pbase is discriminated. If affirmatively judged at the step S309, then the task of the step S106 is executed. While, if negatively judged at the step S309, the task of the step S308 is repeated.

Meanwhile, pursuant to the present embodiment, instead of the differential pressure across the filter 10, the pressure in the exhaust passage 6 upstream of the filter 10 may be used as a criterion value for initiation and termination of the execution of the regeneration process. In this case, when the pressure in the exhaust passage 6 upstream of the filter 10 reaches a regeneration requiring pressure, the execution of the regeneration process is initiated, wherein the regeneration requiring pressure is higher than the differential pressure corresponding to the regeneration requiring accumulation amount Mnrm. Further, the execution of the regeneration process is terminated, when the pressure upstream of the filter 10 reaches the base pressure, wherein the base pressure is the pressure corresponding to the base accumulation amount Mbase.

(Diagnosis of Abnormality in Filter Regeneration System)

Pursuant to the present embodiment, whether or not abnormality occurs in the filter regeneration system causing excessive execution frequency of the regeneration process is diagnosed also based on a parameter for execution frequency of regeneration, wherein the parameter for execution frequency of regeneration is calculated as Freq'=(Mreq−Mbase)/(Mnrm−Mbase).

The value of the parameter for execution frequency of regeneration Freq' pursuant to the present embodiment is also 1 in a normal state. While, in case the execution of the regeneration process is initiated by reason that the differential pressure $\Delta P$ reaches the regeneration requiring differential pressure $\Delta$Preq, namely, in case the execution frequency of the regeneration process is higher than in a normal state, the value is less than 1.

While, similar to the parameter for execution frequency of regeneration Freq pursuant to Embodiment 1, the parameter for execution frequency of regeneration Freq' is also correlative to the exhaust gas aggravation factor, and the relationship can be found through an experiment, etc.

A value of the parameter for execution frequency of regeneration Freq', at which the exhaust gas aggravation factor coincides with the upper limit of an allowable range thereof, is determined as a pre-determined criterion value Freq0'. As the result, in case a parameter for execution frequency of regeneration Freq' is below the pre-determined criterion value Freq0', it can be so judged that abnormality is occurring in the filter regeneration system causing execution frequency of the regeneration process so high as to aggravate the nature of exhaust emissions beyond the limit of the allowable range.

(Flow for Diagnosis of Abnormality in Filter Regeneration System)

Figure 11:
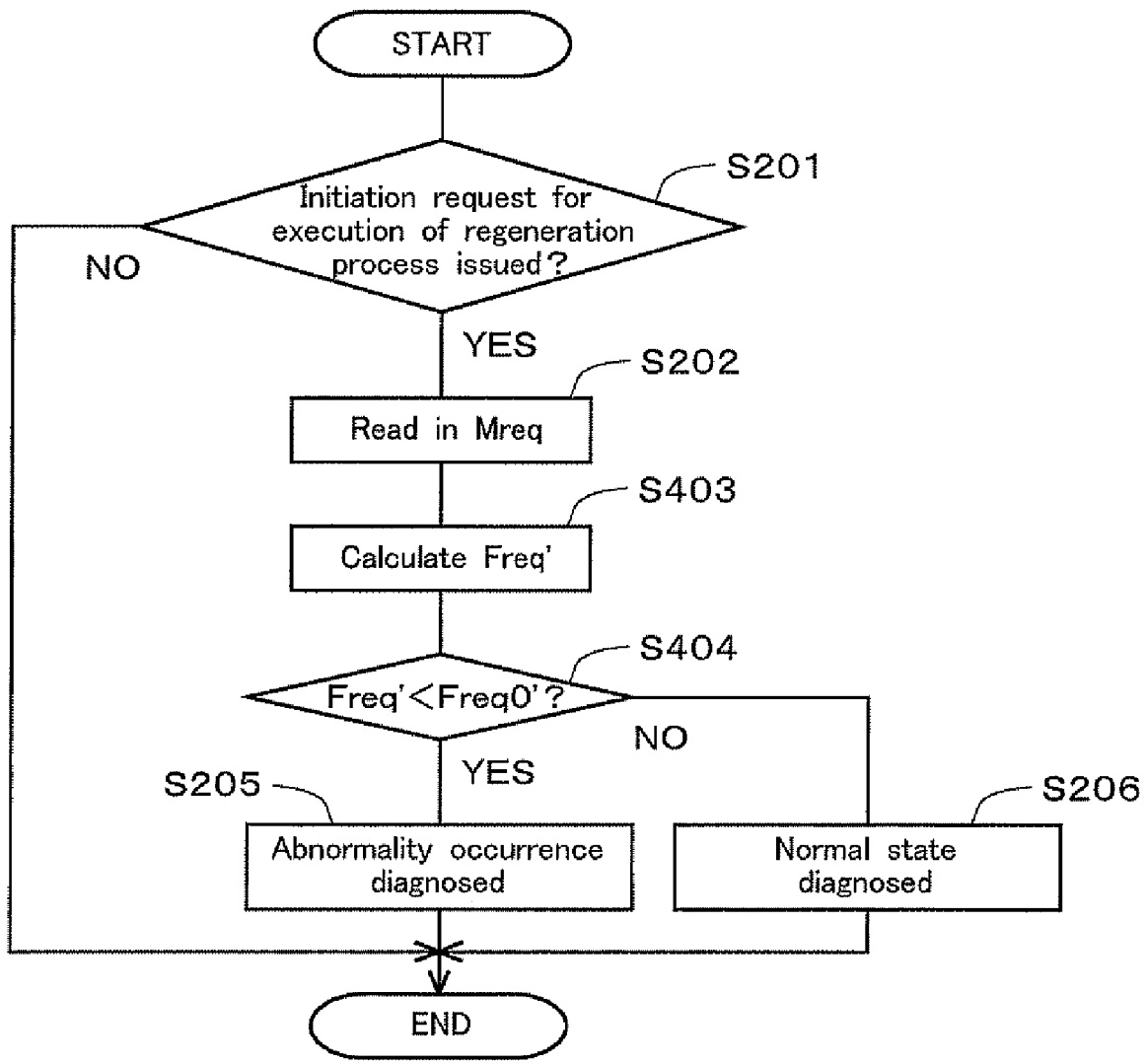
FIG. 11 is a flowchart of the abnormality diagnosis flow in the filter regeneration system pursuant to Embodiment 2.

The flow for diagnosis of abnormality in the filter regeneration system pursuant to the present embodiment will be described with reference to the flow chart shown in FIG. 11. The flow is stored in advance in the ECU 20 and executed by the ECU 20. Meanwhile, the present flow is identical with the flow in FIG. 8, except that steps S203 and S204 therein are replaced by the steps S403 and S404. Consequently, only the tasks of the steps S403 and S404 will be described.

Pursuant to the present flow, at the step S403, the parameter for execution frequency of regeneration Freq' is calculated from the estimated PM accumulation amount at the initiation of the regeneration process Mreq read in at the step S202, the regeneration requiring accumulation amount Mnrm and the base accumulation amount Mbase.

Next, at the step S404, it is discriminated whether or not the parameter for execution frequency of regeneration Freq' is smaller than a pre-determined criterion value Freq0'.

If affirmatively judged at the step S404, next at the step S205 it is so diagnosed that abnormality is occurring in the filter regeneration system causing excessive execution frequency of the regeneration process. If negatively judged at the step S404, next at the step S206 it is so diagnosed that the filter regeneration system is in a normal state.

The parameter for execution frequency of regeneration Freq' pursuant to the present embodiment is also a value that varies due to the shift of the initiation timing of the execution of the regeneration process from the normal timing, in case abnormality occurs in the filter regeneration system. However, similar to the parameter for execution frequency of regeneration Freq pursuant to Embodiment 1, the parameter for execution frequency of regeneration Freq' is not a value that varies in accordance with operation conditions of the internal combustion engine between the previous termination time of the regeneration process and the current initiation time of the regeneration process.

Consequently, as described above, by diagnosing abnormality based on the parameter for execution frequency of regeneration Freq' pursuant to the present embodiment, whether or not abnormality occurs in the filter regeneration system causing excessive execution frequency of the regeneration process can be diagnosed with higher accuracy.

Meanwhile, the ECU 20, which executes the task of the step S403 of the abnormality diagnosis flow, is equivalent to the parameter calculation unit according to the present invention. Further, the ECU 20, which executes the tasks of the steps S404, S205 and S206 of the abnormality diagnosis flow, is equivalent to the diagnosis unit according to the present invention.

Embodiment 3

The outline constitution of an internal combustion engine and an intake-exhaust system thereof pursuant to the present embodiment is similar to Embodiment 1. Further, the regeneration process pursuant to the present embodiment is executed according to a method similar to Embodiment 1.

(Diagnosis of Abnormality in Filter Regeneration System)

Examples of the abnormality in the filter regeneration system causing excessive execution frequency of the regeneration process include the following (a) to (e):

(a) an excessive PM discharge amount from an internal combustion engine 1;

(b) decrease in the continuous regeneration ability of a NOx storage reduction catalyst 14;

(c) disorder in the regeneration process;

(d) increase of the accumulation amount of materials poorly removable by the regeneration process (e.g. ashes); and (e) failure of a differential pressure sensor 17 (faulty offset or faulty sensitivity).

The (a) above is caused by poor sprayability of the fuel injection valve 3, excessive amount of the EGR gas, etc. The (b) above is caused by decrease in the oxidation function of the NOx storage reduction catalyst 14 through degradation. The continuous regeneration referred to above means that the PM is oxidized and removed, when the regeneration process is not executed, by the temperature increase of the exhaust gas. The (c) above is caused by a failure of a fuel addition valve 13 or a temperature sensor 15, 16. If any of the abnormality (a) to (c) should occur, the conditions of the filter 10 become different from those expected during the execution of the regeneration process, and the residual PM increases.

Pursuant to the present embodiment, as in Embodiment 1, a parameter for execution frequency of regeneration is calculated as Freq=Mreq/Mnrm. The parameter for execution frequency of regeneration Freq is calculated at each execution of the regeneration process.

If the abnormality (d) or (e) should occur, the output signal of the differential pressure sensor 17 continues to indicate an abnormal value. Consequently, the regeneration process may be initiated each time by reason that the differential pressure ΔP reaches the regeneration requiring differential pressure ΔPreq. As the result, at each execution of the regeneration process the calculated parameter for execution frequency of regeneration Freq indicates an abnormal value (a value less than a criterion value Freq0). In this case the diagnosis of abnormality in the filter regeneration system can be carried out based on the parameter for execution frequency of regeneration Freq calculated at a single execution of the regeneration process.

While, the parameter for execution frequency of regeneration Freq indicates an abnormal value due to occurrence of any of the abnormality (a) to (c), because increase of the PM accumulation amount at the filter 10 is faster than in a normal state, and the PM accumulation amount becomes excessive. In other words, with the excessive PM accumulation amount, the differential pressure ΔP reaches the regeneration requiring differential pressure ΔPreq, and the regeneration process is initiated.

In this case, since the PM accumulation amount is significantly decreased by the execution of the regeneration process, even if at a single execution of the regeneration process the parameter for execution frequency of regeneration Freq should indicate an abnormal value, the parameter for execution frequency of regeneration Freq may not necessarily indicate an abnormal value at the following executions of the regeneration process. Therefore, when a plurality of executions of the regeneration process are carried out, at some executions the parameter for execution frequency of regeneration Freq indicates abnormal, but at other executions normal. Consequently, in case of abnormality due to (a) to (c) above, it is difficult to diagnose accurately the abnormality in the filter regeneration system solely based on the parameter for execution frequency of regeneration Freq calculated at a single execution of the regeneration process.

It is possible in rare cases that the parameter for execution frequency of regeneration Freq indicates an abnormal value due to a noise at a differential pressure sensor or the like, even if there occurs actually no abnormality in the filter regeneration system. An occurrence rate of such abnormal value of the parameter for execution frequency of regeneration Freq is quite low compared to the occurrence rate of the abnormal value of the parameter for execution frequency of regeneration Freq due to the abnormality according to (a) to (c) above. However, if abnormality in the filter regeneration system is diagnosed solely based on the parameter for execution frequency of regeneration Freq calculated at a single execution of the regeneration process, such exceptional case may be diagnosed erroneously as abnormality in the system.

Consequently, pursuant to the present embodiment, the parameter for execution frequency of regeneration Freq is calculated at each execution of the regeneration process, and after completion of a pre-determined number of the executions of the regeneration process an average value of the parameter for execution frequency of regeneration is calculated. Then, based on the average value, whether or not abnormality is occurring in the filter regeneration system causing excessive execution frequency of the regeneration process is diagnosed.

The pre-determined number means herein such a number of executions of the regeneration process, that, in case abnormality in the filter regeneration system should occur, irrespective of the type of the abnormality, at any one of the pre-determined number of executions of the regeneration process the parameter for execution frequency of regeneration indicates an abnormal value. The pre-determined number can be determined in advance by an experiment.

By the above measures, abnormality can be detected irrespective of the type of the abnormality in the filter regeneration system. Consequently, whether or not abnormality is occurring in the filter regeneration system can be diagnosed with higher accuracy.

(Flow for Diagnosis of Abnormality in Filter Regeneration System)

Figure 12:
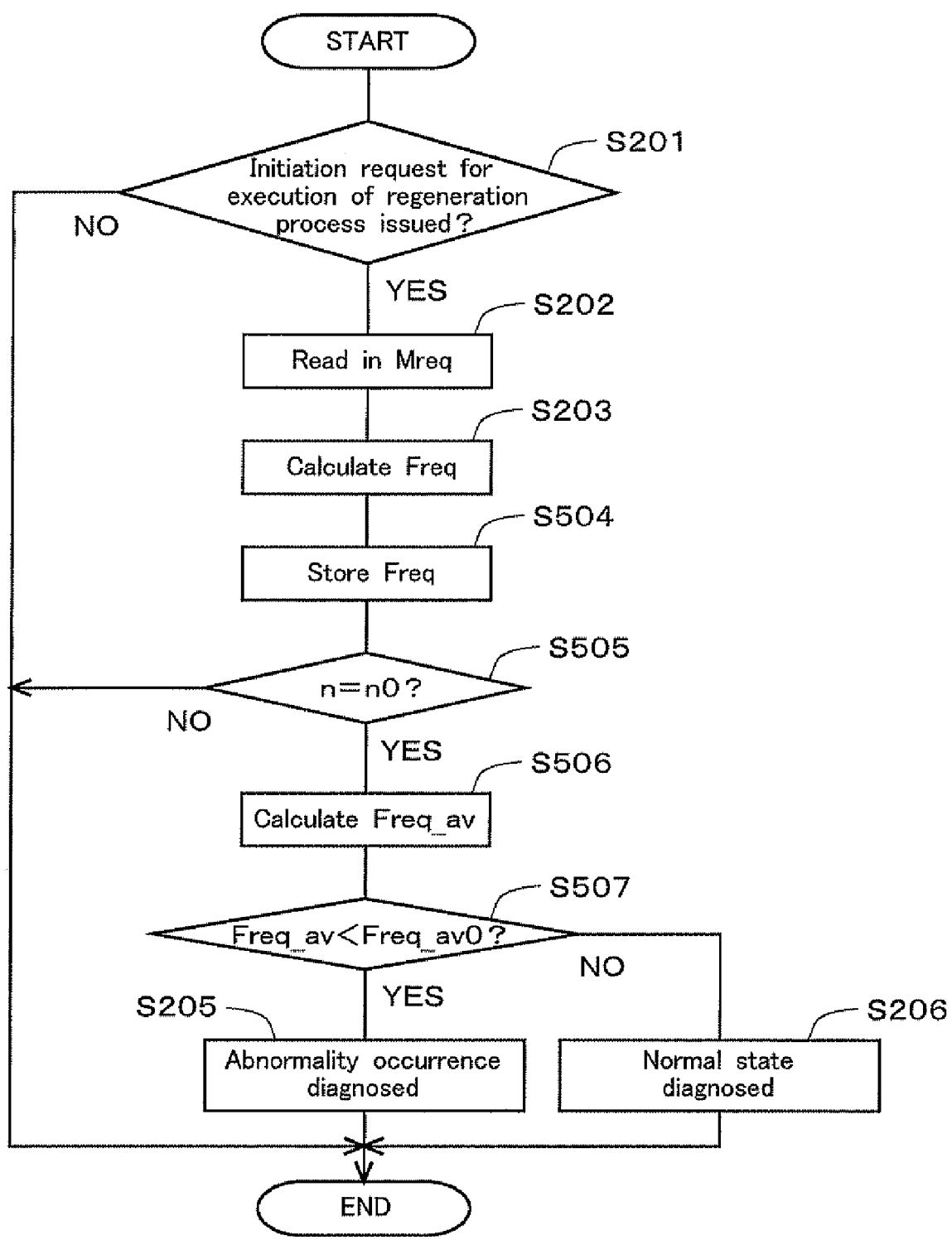
FIG. 12 is a flowchart of the abnormality diagnosis flow in the filter regeneration system pursuant to Embodiment 3.

The flow for diagnosis of abnormality in the filter regeneration system pursuant to the present embodiment will be described with reference to the flow chart shown in FIG. 12. The flow is stored in advance in the ECU 20 and executed by the ECU 20. Meanwhile, the present flow is identical with the flow in FIG. 8, except that step S204 therein is replaced by the steps S504 to S507. Consequently, only the tasks for the steps S504 to S507 will be described.

Pursuant to the present flow, at the step S504 the parameter for execution frequency of regeneration Freq calculated at the step S203 is stored.

Next, at the step S505, it is discriminated whether or not the number of executions of the regeneration process n after the previous execution of the abnormality diagnosis for the filter regeneration system reached a pre-determined number n0. If affirmatively judged at the step S505, then the task of the step S506 is executed, and if negatively judged the execution of the flow is stopped awhile.

At the step S506, the average value Freq_av of the values of the parameter for execution frequency of regeneration after n-time executions of the regeneration process is calculated.

Next, at the step S507, it is discriminated whether or not the average value Freq_av of the parameter for execution frequency of regeneration is smaller than a pre-determined criterion value Freq_av0. In this case, similar to the pre-determined criterion value Freq0 pursuant to Embodiment 1, an average value of the parameter for execution frequency of regeneration Freq_av, at which the exhaust gas aggravation factor coincides with the upper limit of an allowable range of the exhaust gas aggravation factor, is determined as a pre-determined criterion value Freq_av0.

If affirmatively judged at the step S507, next at the step S205 it is so diagnosed that abnormality is occurring in the filter regeneration system causing excessive execution frequency of the regeneration process. If negatively judged at the step S507, next at the step S206 it is so diagnosed that the filter regeneration system is in a normal state.

Meanwhile, pursuant to the present embodiment, the ECU 20, which executes the tasks of the step S506 of the abnormality diagnosis flow, is equivalent to the average calculation unit according to the present invention.

(Variations)

Pursuant to the above-described method for diagnosing abnormality, the pre-determined number n0 as the number of executions of the regeneration process required for calculating an average value Freq_av of the parameter for execution frequency of regeneration is determined in advance based on an experiment. However, the pre-determined number n0 may be determined from the historical relationship between the travel distance of the vehicle and the timing at which the parameter for execution frequency of regeneration Freq became abnormal.

In this case, when an abnormal value of the parameter for execution frequency of regeneration probably caused by the abnormality (a) to (c) appears, a vehicle travel distance, within which the abnormal value can be detected, is determined and used as a pre-determined travel distance. Then based on the distance the vehicle has travelled between the previous execution of the regeneration process and the current execution of the regeneration process, and the pre-determined travel distance, the number of the executions of the regeneration process to be executed during traveling the pre-determined travel distance is estimated. The estimated value is used as the pre-determined number n0.

In this case, the pre-determined travel distance is a travel distance, within which at least one abnormal value of the parameter for execution frequency of regeneration should appear, and may be a travel distance, within which a plurality of abnormal values of the parameter for execution frequency of regeneration appear. Namely, the pre-determined travel distance is a travel distance, which gives the value of the pre-determined number n0 allowing the diagnosis of the abnormality in the filter regeneration system with adequate accuracy.

Furthermore, the method for diagnosing abnormality in the filter regeneration system pursuant to the present embodiment may be applied to the case, in which the regeneration process is executed according to a method similar to Embodiment 2. In such case, the abnormality diagnosis is made based on the average value Freq'_av of the values of the parameter for execution frequency of regeneration Freq'(Mreq−Mbase)/(Mnrm−Mbase)) with respect to the pre-determined number of executions of the regeneration process, in replace of the average value Freq_av of the values of the parameter for execution frequency of regeneration Freq(=Mreq/Mnrm) with respect to the pre-determined number of executions of the regeneration process.

In case it is so diagnosed by the method for diagnosing abnormality pursuant to any of the embodiments, that abnormality in the filter regeneration system is occurring, a driver of the vehicle equipped with the internal combustion engine 1 may be notified to that effect.

The invention claimed is:

1. An abnormality diagnosis system for a filter regeneration system for executing a regeneration process of a particulate filter placed in an exhaust passage of an internal combustion engine, wherein the filter regeneration system comprises:
   an accumulation amount estimation unit for estimating an accumulation amount of particulate matter at the particulate filter;
   a pressure determination unit for determining a pressure upstream of the particulate filter in the exhaust passage or a differential pressure across the particulate filter; and
   an execution unit for the regeneration process for executing the regeneration process to oxidize and remove the particulate matter accumulated at the particulate filter; and
   initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount, wherein
   the abnormality diagnosis system for the filter regeneration system comprises:
   a parameter calculation unit for calculating a ratio of:
   an accumulation amount of the particulate matter at the initiation of the execution of the regeneration process estimated by the accumulation amount estimation unit
   to the regeneration requiring accumulation amount;
   as a parameter for execution frequency of regeneration; and
   a diagnosis unit for diagnosing based on the parameter for execution frequency of regeneration whether or not abnormality is occurring in the filter regeneration system causing excessive execution frequency of the regeneration process.

2. The abnormality diagnosis system for a filter regeneration system according to claim 1, wherein the diagnosis unit diagnoses an occurrence of abnormality in the filter regeneration system causing excessive execution frequency of the regeneration process, in case the parameter for execution frequency of regeneration Freq is smaller than a predetermined criterion value, wherein the parameter for execution frequency of regeneration Freq is determined by $Freq=Mreq/Mnrm$, where Mreq stands for an accumulation amount of the particulate matter at the initiation of execution of the regeneration process estimated by the accumulation amount estimation unit, and Mnrm stands for the regeneration requiring accumulation amount.

3. The abnormality diagnosis system for a filter regeneration system according to claim 2, further comprising an average calculation unit for calculating an average value of the parameter for execution frequency of regeneration when the regeneration process is executed a pre-determined number of times; wherein
   the diagnosis unit diagnoses whether or not abnormality occur in the filter regeneration system causing excessive execution frequency of the regeneration process, based on the average value of the parameter for execution frequency of regeneration calculated by the average calculation unit.

4. The abnormality diagnosis system for a filter regeneration system according to claim 3, wherein the pre-determined number of times is a number of the times of executions of the regeneration process from a previous diagnosis of an occurrence of abnormality in the filter regeneration system until a travel distance of a vehicle equipped with an internal combustion engine reaches a pre-determined travel distance.

5. The abnormality diagnosis system for a filter regeneration system according to claim 1, further comprising an average calculation unit for calculating an average value of the parameter for execution frequency of regeneration when the regeneration process is executed a pre-determined number of times; wherein
   the diagnosis unit diagnoses whether or not abnormality occur in the filter regeneration system causing excessive execution frequency of the regeneration process, based on the average value of the parameter for execution frequency of regeneration calculated by the average calculation unit.

6. The abnormality diagnosis system for a filter regeneration system according to claim 5, wherein the pre-determined number of times is a number of the times of executions of the regeneration process from a previous diagnosis of an occurrence of abnormality in the filter regeneration system until a travel distance of a vehicle equipped with an internal combustion engine reaches a pre-determined travel distance.

7. An abnormality diagnosis system for a filter regeneration system for executing a regeneration process of a particulate filter placed in an exhaust passage of an internal combustion engine, wherein the filter regeneration system comprises:
   an accumulation amount estimation unit for estimating an accumulation amount of particulate matter at the particulate filter;
   a pressure determination unit for determining a pressure upstream of the particulate filter in the exhaust passage or a differential pressure across the particulate filter; and
   an execution unit for the regeneration process for executing the regeneration process to oxidize and remove the particulate matter accumulated at the particulate filter;
   initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount; and
   terminates the execution of the regeneration process, in case, after the initiation of the execution of the regeneration process, the accumulation amount of the particulate matter at the particulate filter is judged to have decreased to a pre-determined base accumulation amount, wherein the abnormality diagnosis system for the filter regeneration system comprises:
   a parameter calculation unit for calculating a ratio of:
   the difference between an accumulation amount of the particulate matter at the initiation of the execution of the regeneration process estimated by the accumulation amount estimation unit and the base accumulation amount
   to the difference between the regeneration requiring accumulation amount and the base accumulation amount;
   as a parameter for execution frequency of regeneration; and a diagnosis unit for diagnosing based on the parameter for execution frequency of regeneration whether or not abnorinality is occurring in the filter regeneration system causing excessive execution frequency of the regeneration process.

8. The abnormality diagnosis system for a filter regeneration system according to claim 7, wherein the diagnosis unit diagnoses an occurrence of abnormality in the filter regeneration system causing excessive execution frequency of the regeneration process, in case the parameter for execution frequency of regeneration Freq' is smaller than a pre-determined criterion value, wherein the parameter for execution frequency of regeneration Freq' is determined by Freq' (Mreq−Mbase)/(Mnrm−Mbase), where Mreq stands for an accumulation amount of the particulate matter at the initiation of execution of the regeneration process estimated by the accumulation amount estimation unit, Mnrm stands for the regeneration requiring accumulation amount, and Mbase stands for the base accumulation amount.

9. The abnormality diagnosis system for a filter regeneration system according to claim 8, further comprising an average calculation unit for calculating an average value of the parameter for execution frequency of regeneration when the regeneration process is executed a pre-determined number of times; wherein
the diagnosis unit diagnoses whether or not abnormality occur in the filter regeneration system causing excessive execution frequency of the regeneration process, based on the average value of the parameter for execution frequency of regeneration calculated by the average calculation unit.

10. The abnormality diagnosis system for a filter regeneration system according to claim 9, wherein the pre-determined number of times is a number of the times of executions of the regeneration process from a previous diagnosis of an occurrence of abnormality in the filter regeneration system until a travel distance of a vehicle equipped with an internal combustion engine reaches a pre-determined travel distance.

11. The abnormality diagnosis system for a filter regeneration system according to claim 7, further comprising an average calculation unit for calculating an average value of the parameter for execution frequency of regeneration when the regeneration process is executed a pre-determined number of times; wherein
the diagnosis unit diagnoses whether or not abnormality occur in the filter regeneration system causing excessive execution frequency of the regeneration process, based on the average value of the parameter for execution frequency of regeneration calculated by the average calculation unit.

12. The abnormality diagnosis system for a filter regeneration system according to claim 11, wherein the pre-determined number of times is a number of the times of executions of the regeneration process from a previous diagnosis of an occurrence of abnormality in the filter regeneration system until a travel distance of a vehicle equipped with an internal combustion engine reaches a pre-determined travel distance.

13. A method for diagnosing abnormality in a filter regeneration system, wherein the filter regeneration system executes a regeneration process of a particulate filter placed in an exhaust passage of an internal combustion engine; and comprises:
an accumulation amount estimation unit for estimating an accumulation amount of particulate matter at the particulate filter;
a pressure determination unit for determining a pressure upstream of the particulate filter in the exhaust passage or a differential pressure across the particulate filter; and
an execution unit for the regeneration process for executing the regeneration process to oxidize and remove the particulate matter accumulated at the particulate filter; and
initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount, wherein
the method for diagnosing abnormality in the filter regeneration system comprises:
a step for calculating a ratio of an accumulation amount of the particulate matter at the initiation of the execution of the regeneration process estimated by the accumulation amount estimation unit to the regeneration requiring accumulation amount, as a parameter for execution frequency of regeneration; and
a step for diagnosing based on the parameter for execution frequency of regeneration whether or not abnormality is occurring in the filter regeneration system causing excessive execution frequency of the regeneration process.

14. A method for diagnosing abnormality in a filter regeneration system, wherein the filter regeneration system executes a regeneration process of a particulate filter placed in an exhaust passage of an internal combustion engine; and comprises:
an accumulation amount estimation unit for estimating an accumulation amount of particulate matter at the particulate filter;
a pressure determination unit for determining a pressure upstream of the particulate filter in the exhaust passage or a differential pressure across the particulate filter; and
an execution unit for the regeneration process for executing the regeneration process to oxidize and remove the particulate matter accumulated at the particulate filter; and
initiates execution of the regeneration process by the execution unit for the regeneration process, in case the accumulation amount of the particulate matter estimated by the accumulation amount estimation unit reaches a pre-determined regeneration requiring accumulation amount; or in case the pressure or the differential pressure determined by the pressure determination unit reaches a pre-determined regeneration requiring value, the value being larger than the pressure or the differential pressure corresponding to the regeneration requiring accumulation amount; and terminates the execution of the regeneration process,
in case, after the initiation of the execution of the regeneration process, the accumulation amount of the particulate matter at the particulate filter is judged to have decreased to a pre-determined base accumulation amount, wherein
the method for diagnosing abnormality in the filter regeneration system comprises:
a step for calculating a ratio of
the difference between an accumulation amount of the particulate matter at the initiation of the execution of the regeneration process estimated by the accumulation amount estimation unit and the base accumulation amount to the difference between the regeneration requiring accumulation amount and the base accumulation amount, as a parameter for execution frequency of regeneration; and a step for diagnosing based on the parameter for execution frequency of regeneration whether or not abnormality is occurring in the filter regeneration system causing excessive execution frequency of the regeneration process.

* * * * *